(12) United States Patent
Anderson et al.

(10) Patent No.: US 6,710,175 B2
(45) Date of Patent: Mar. 23, 2004

(54) COMPOSITIONS SUITABLE AS ADDITIVES IN THE PAPER INDUSTRY, PREPARATION; USE; AND, PAPER COMPRISING SUCH

(76) Inventors: Kevin Ray Anderson, 1603 Hamer Dr. NW., Cedar Rapids, IA (US) 52405; Anton Esser, Mönchworthstrasse 6, 68199 Mannheim (DE); Lawrence Edward Fosdick, 609-21st Ave. W., Oskaloosa, IA (US) 52577; Ki-Oh Hwang, 227 Keomah Village, Oskaloosa, IA (US) 52577; Norbert Mahr, Zeppelinweg 2, 67117 Limburgerhof (DE); John Thomas McDonald, Jr., 690 Dickinson St., Memphis, TN (US) 38107; Dogan Sahin Sivasligil, Schenkkade 297, 2595 Az The Hague (NL); Andreas Stange, Tannhäuserring 36, 68199 Mannheim (DE); Sarah Veelaert, Aak 25, 4617 Ga Bergen op Zoom (NL); Martin Wendker, Burkhardstrasse 9, 67549 Worms (DE)

( * ) Notice: Subject to any disclaimer, the term of this patent is extended or adjusted under 35 U.S.C. 154(b) by 0 days.

(21) Appl. No.: 09/944,718

(22) Filed: Aug. 31, 2001

(65) Prior Publication Data

US 2003/0150573 A1 Aug. 14, 2003

(51) Int. Cl.$^7$ .................... C08B 31/18; D21F 17/29
(52) U.S. Cl. .................... 536/45; 536/104; 536/105; 162/175; 162/164.6; 162/168.2; 106/208.1; 106/208.4; 527/309
(58) Field of Search .................... 528/228, 229, 528/269, 354; 106/162.1, 206.1, 208.1, 214.1, 217.6; 162/158, 164.6, 166, 167, 168.2, 173, 174, 175; 524/47, 49; 525/54.24, 54.31; 527/300, 304, 305, 309, 312; 536/45, 47, 48, 50, 104, 105

(56) References Cited

U.S. PATENT DOCUMENTS

| | | | | |
|---|---|---|---|---|
| 3,086,969 A | * | 4/1963 | Slager | 536/105 |
| 3,138,473 A | * | 6/1964 | Floyd et al. | 106/162.9 |
| 3,299,052 A | * | 1/1967 | Curtis | 536/104 |
| 3,329,672 A | | 7/1967 | Roberts | 536/50 |
| 3,450,692 A | | 6/1969 | Hyldon et al. | 536/105 |
| 3,467,608 A | * | 9/1969 | Dishburger et al. | 536/45 |
| 3,553,193 A | * | 1/1971 | LeRoy | 536/105 |
| 3,615,786 A | * | 10/1971 | Moskaluk | 106/208.1 |
| 3,632,802 A | * | 1/1972 | BeMiller et al. | 536/105 |
| 3,649,624 A | * | 3/1972 | Powers et al. | 536/50 |
| 3,719,514 A | * | 3/1973 | Taylor | 106/208.4 |
| 3,728,214 A | * | 4/1973 | Espy | 162/164.6 |
| 4,097,427 A | * | 6/1978 | Aitken et al. | 527/312 |
| 4,122,253 A | * | 10/1978 | Watts et al. | 536/50 |
| 4,839,449 A | * | 6/1989 | Billmers et al. | 106/163.01 |
| 4,940,514 A | * | 7/1990 | Stange et al. | 162/168.2 |
| 6,235,835 B1 | * | 5/2001 | Niessner et al. | 162/168.1 |
| 6,368,456 B1 | * | 4/2002 | Cimecioglu et al. | 162/146 |

FOREIGN PATENT DOCUMENTS

| | | |
|---|---|---|
| GB | 1081957 | 9/1967 |
| WO | WO 98/31740 | 7/1998 |
| WO | WO 00/60167 | 10/2000 |
| WO | WO 01/83887 A1 | 11/2001 |

OTHER PUBLICATIONS

Young, R., "Bonding Of Oxidized Cellulose Fibers And Interaction With Wet–Strength Agents," *The Institute of Paper Science And Technology, Database Paperchem 'Online!*, Abstract, 1 pg. (1978).

* cited by examiner

*Primary Examiner*—Steven P. Griffin
*Assistant Examiner*—Eric Hug
(74) *Attorney, Agent, or Firm*—Merchant & Gould P.C.

(57) ABSTRACT

According to the present disclosure, starch/polymer combinations are provided. The preferred starch/polymer combinations are usable as paper additives, in the wet end of a papermaking process. Typical and preferred starch/polymer combinations of this type, result from combining a starch, having a polymer reactive carbonyl functionality, with a polymer, having a carbonyl reactive functionality, under conditions that allow for covalent interaction between the two. Typically usable components comprise oxidized starch and polymer having reactive primary or reactive secondary amine groups. Also provided are methods of preparing such combinations, methods of use, preferred papers including such combinations, and, analytical techniques usable in preparation of such combinations.

8 Claims, No Drawings

COMPOSITIONS SUITABLE AS ADDITIVES IN THE PAPER INDUSTRY, PREPARATION; USE; AND, PAPER COMPRISING SUCH

FIELD OF INVENTION

The present invention relates to: (a) compositions suitable as additives in the paper industry; (b) to preferred modified starches as components of such compositions; (c) to processes for providing such compositions; (d) to paper or paper products comprising such compositions; and (e) to processes for manufacturing paper or paper-like products which include such compositions.

BACKGROUND

Starches are widely used in the paper industry as wet end additives, as size-press additives, as binders in coatings and as adhesives. Advantages of the use of starch in paper can, for example, be the increased strength of the resulting paper, improved runnability, enhanced drainage, reduced amount of pollutants released, increased hydrophobicity or increased optical properties such as brightness and color.

An important property in practically all grades of paper is the above referred to paper strength. Not only do most papers require a minimum strength for the ultimate purpose, the paper must also be strong enough to permit efficient handling in manufacture. Many measures for the strength of paper are known. For example, the tensile strength is the greatest longitudinal stress the paper can bear without tearing apart. Since some paper products are subjected to wetting by water in their normal use, the wet tensile strength becomes important. Other well-known tests used to test strength parameters in paper are, for example, the bursting test, or Mullen test.

Natural starches can be used in the manufacture of paper and can be chemically or enzymatically modified. Modified starches often used are, for example, cationic, anionic, oxidized and phosphated starches. Cationic starches are often used to provide retention at the wet end and reduce the amount of pollutants released. Oxidized starch is known to have good film-forming properties and is, therefore, a favored material for coating and surface sizing.

Several problems are attached to the use of starches in the paper industry. For example, unsatisfactory strength increases may occur due to the limited amount of neutral or negatively charged starch that can be added since the starch has little or no attraction to the negative charge of the pulp.

Conventionally used, cationic starch has an attraction to the pulp to provide good retention. However, when cationic starch is added in an amount of more than several percent, the retention of starch in the paper layer is reduced and the starch is released from the paper and enters into the waste water.

It is of continuing interest to find compositions conventionally and cost effectively usable for high starch inclusion in paper or paper like products.

U.S. Pat. No. 4,097,427 relates to a process of cationization of starch in an aqueous medium in the presence of alkali metal hydroxide, cationic water-soluble polymers containing quaternary ammonium groups and an agent. The agents used are, for example, ammonium persulfate, hydrogen peroxide, hypochlorites, ozone, and certain organic peroxides and hydroperoxides. The modified starches thus prepared are used as wet end additives in papermaking to improve the dry strength of the paper.

U.S. Pat. No. 4,146,515 (Nalco Chemical Corp) discloses paper and other cellulosic material sized with a cationic starch prepared by forming an aqueous slurry of an oxidized starch, adding cationizing agent to the slurry and heating the slurry in a continuous cooker. More specifically, U.S. Pat. No. 4,146,515 relates to a process for the preparation of a cationic starch by forming an aqueous slurry of a lightly oxidized starch by starch with hypochlorite, adding a cationizing agent to the slurry and then heating the slurry in a continuous cooker. Suitable cationizing agents are, quaternized ethylene dichloride ammonia reaction products, diallyl/dimethyl ammonium chloride polymers and quaternized polyethyleneimines.

U.S. Pat. No. 4,818,341 describes a process for producing paper and paperboard of high dry strength by adding a mixture of a polymer modified potato starch to the paper stock and dewatering the paper stock with sheet formation. The potato starch is modified by heating an aqueous slurry of 100 parts by weight of potato starch with 1 to 20 parts by weight of cationic polymer which contains units of diallyldimethylammonium chloride, vinylamine or N-vinylimidazoline, at a temperature above the gelatinization temperature of potato starch in the absence of any agent, polymerization initiator of alkali.

A similar process for the production of paper, paperboard and cardboard is described in U.S. Pat. No. 4,940,514. In this process an enzymatically digested starch having a viscosity of from 20 to 2,000 mPa.s (measured in 7.5% strength aqueous solution at 45° C.) is modified by treating with at least one of the cationic polymers specified above. The modified starch thus obtained is used as a wet end additive in the paper industry.

WO-A-98/31711 relates to a process for the production of starch which is modified with at least one cationic polymer. The polymer modified with starch is obtained by reacting an anionically modified starch with a cationic polymer or by reacting a natural starch or a non-anionically modified starch with a cationic polymer in the presence of an anionic modifier. Suitable anionic modifiers described include alpha-halogencarboxylic acids, inorganic or organic acids. The polymer modified starches are used as wet end additives in the production of paper and paper products.

U.S. Pat. No. 4,263,094 (BASF Wyandotte) discloses a cellulosic material such as paper or paperboard surface-sized with an aqueous dispersion of a combination of degraded starch derivative and a branched-chain, water dispersible polyester condensation product. The starch according to the invention is an alkaline-hypochlorite degraded starch having a decreased viscosity in comparison with the untreated starch.

EP776397 (Chemisolv Limited) describes a process of applying a high molecular weight polymer having a polyhydroxy backbone (e.g., starch) to a substrate, comprising adding to a solution of such material in anionic form a flocculent of oppositely charged form in order to insolubilise such material, and thereafter applying such insolubilised material to said substrate. The subject matter is disclosed as having particular application in respect of production of paper by adding to the slurry supplied in paper production an anionic starch and a cationic flocculent. Preferred flocculants disclosed are polyacrylamide cationic polymer, a copolymerised acrylamide/diallyldimethyl ammonium chloride or mannich acrylamide, or any other high molecular weight cationic (co) polymer carrying a permanently quaternized nitrogen.

JP54059416 describes the joint use of cationic polyamide-epichlorohydrin resin and anionic dialdehyde starch as dry and wet strength enhancer.

U.S. Pat. No. 4,925,530 (The Wiggins Teape Group Limited) discloses a process in which aqueous suspensions of papermaking fibers and filler are each separately treated with an anionic or a cationic polymer, after which the filler or the papermaking fiber is treated with a polymer of opposite charge to that used in the initial treatment. The initial treating polymer is characterized as preferably a papermaking retention aid or flocculent, e.g., a cationic polyacrylamide or an amine/amide/epichlorohydrin copolymer, in the case of cationic materials, or an anionic polyacrylamide, in the case of anionic materials. The further treating polymer is characterized as preferably an anionic or cationic starch, depending on the charge of the initial polymer.

WO9831740 (BASF AG) discloses starches with improved retention on cellulose fibers, useful as dry paper strength agents and as draining and retention acids, which are prepared by treating dry, flowable starch with an aqueous solution of cationic polymers and drying.

DE19701523 (BASF AG) describes a starch, which has been modified with at least one cationic polymer and a method for producing the same. The method for producing the modified starch includes the reaction of an anionic starch with a cationic polymer. Alternatively the modified starch can be prepared by reacting a native starch or a non-anionically modified starch with a cationic polymer in the presence of an anionic modifier.

U.S. Pat. No. 4,006,112 (Standard Oil Company) describes a polyester of a trimellitic acid compound having an average molecular weight under about 4000 and an acid number of at least 35 and starch paper sizing composition containing said polyester. Suitable starch sizes can be based on e.g., corn or wheat starch. Prior to use, the starches are modified, such as by alkaline-hypochlorite oxidation, acid or enzyme thinning and/or derivation to a low DS (degree of substitution).

SUMMARY OF THE INVENTION

According to the present disclosure a composition is provided comprising the result of combining a starch component, as defined, with a polymer component, as defined. In general, the preferred starch component comprises a starch having polymer-reactive carbonyl functionality therein, typically and preferably aldehyde functionality detectable by a Tollen's test; and, the preferred polymer component is one having aldehyde-reactive functionality.

The starch component may be provided by oxidizing starch. Preferred oxidizing agents and conditions are characterized below.

Preferably the starch component is one having a reactive carbonyl functionality of at least 5 microequivalents per gram, more preferably at least 10 microequivalents per gram, and typically not more than 300 microequivalents per gram.

Preferably the polymer is one having reactive groups selected from primary amine groups and secondary amine groups. Typically and preferably the polymer component comprises a polyvinylamine polymer.

Preferred starch components and polymer components are characterized in more detail below.

The current disclosure also concerns methods of papermaking. Advantageous methods of papermaking are conducted using compositions as characterized herein. In some instances, high starch inclusion can be accomplished without the use of a sizing press step in the papermaking operation.

The current disclosure also concerns preferred paper materials, and paper products made in accord with the preferred processes characterized.

DETAILED DESCRIPTION

I. Preferred Starch/Polymer Compositions and Their Preparation

A. General Characterizations

According to one aspect, the present invention concerns provision of compositions in the form of starch/polymer combinations. Typical, preferred, starch/polymer combinations as described herein are of one of two types:

1. A preferred adducted combination of starch/polymer; or,
2. A preferred mixture, or combination, of starch and polymer which, although not in a form of an adducted combination, is in a combination that when appropriately introduced into a process such as a papermaking process, for example through a jet cooker, will form an adducted combination of the starch and polymer.

In general, the starch/polymer combinations comprise the result of combining:

(a) modified starch which includes a polymer reactive carbonyl functionality, typically aldehydic functionality, detectable by a Tollen's test; and
(b) natural and/or synthetic reactive polymer component; i.e., polymer component having a carbonyl reactive functionality, typically aldehyde reactive functionality.

When it is said that the starch/polymer combinations comprise "the result of combining" the components characterized, unless specified it is not meant that the composition is necessarily reacted to form an adducted combination. Alternatively stated, the phrase "the result of combining", without further limitation, is meant to refer to the components having been brought together, without regard to whether they have been reacted; that is, without regard to whether the carbonyl functionality in the modified starch is in fact reacted with the carbonyl reactive functionality in the polymer component.

Further, the term "the result of combining" is not meant to indicate specifically the method of combination, conditions of combination, or limitation on other additives, unless otherwise limited or specified.

Thus, as indicated above, the combinations may be "adducted combinations", or in certain instances may be mixtures which, when used, will form adducted combinations. Herein the term "adducted combination", and variants thereof, is meant to refer to a combination in which the starch component and the polymer component are chemically associated and are not merely mixed. That is, the term "adducted" is not meant to refer to compositions in which the starch component and polymer component are merely mixed, but are not chemically associated. Herein, the "adducted combination" will be sometimes be alternatively termed "polymer modified starch."

When it is said that the starch component and the polymer component are combined to form an "adducted combination", no specific characterization or limitation on the nature of the chemical interaction between the two components is meant, unless further characterization is provided. Thus, the interactions or attractions may be ionic, they may be covalent, or they may be a combination of both. In general, however, the requirement that the starch component have a polymer reactive carbonyl functionality is meant to refer to a functionality which, under appropriate conditions, is capable of forming covalent interactions with carbonyl reactive functionality in the polymer component; and, when it is said specifically that the polymer component has a carbonyl reactive functionality, it is meant that the polymer component contains functionality capable of covalent reaction with the reactive carbonyl functionality in the starch. Thus, when appropriate conditions are utilized in association with combinations according to the present disclosure, at least to some extent covalent interaction between the starch component and the polymer component are expected.

It is noted that in many instances an ionic interaction between the starch component and the polymer component will also occur. This will occur for example when the starch component includes anionic groups, such as carboxyl functionalities, and the polymer component contains cationic groups, such as various amine groups or protonated amine groups.

Thus, in "adducted combinations" according to the present disclosure, both covalent interactions and ionic interactions may be present, although the term "adducted combination" by itself is not meant to refer to a specific level of interaction of either type.

1. The Starch Component—Generally

An aspect to the present invention is the provision of preferred starch components for use in forming preferred adducted combinations of starch/polymer.

In general, when defined with respect to polymer reactive carbonyl functionalities, typically aldehyde groups, preferred usable starches in accord with the present principles are modified starches which are can be characterized as follows:

(A) When evaluated by the Tollen's technique described below, in connection with Experiment 7a for bulk analysis, the starch component has at least 5 microequivalents of aldehyde groups per gram of starch; typically and preferably at least 10 microequivalents/gram, and generally an amount within the range of 20 to 300 microequivalents/gram starch.

(B) When the starch component is in a form that also includes carboxyl groups, it preferably has a ratio of carbonyl groups to carboxyl groups of at least 1:1, typically at least 2:1, and generally within the range of 2.5:1 to 5:1; when the carbonyl groups are evaluated by the Tollen's test of Experiment 7a and the carboxyl groups are measured by the potentiometric test of Experiment 8.

A preferred usable and convenient manner for providing usable modified starches or starch components, is through oxidation of starch. In general, a manner in which to characterize such an oxidized starch is with respect to the type of oxidizing agent used and/or the amount of oxidizing agent used. When characterized in this manner, in general the oxidizing agent or agents used to prepare the starch should be one (or a mixture) which at least generates detectable levels of reactive carbonyl moities (aldehydic or ketonic) in the resulting starch, whether or not there is also generated carboxyl functionality.

Herein below, a variety of usable oxidizing agents are provided. Preferred ones comprise periodates and hypochlorites. In general, hypochlorites create both carboxyl and carbonyl components, when utilized. Periodates, on the other hand, generally create only carbonyl moities in the starch.

Of the periodates, generally sodium periodate is preferred; and, of the hypochlorites, generally sodium hypochlorite is preferred.

In general, herein the level of oxidant is defined in at least one of two manners. A first is through weight percent oxidant used, based on dry weight of starch. When defined in this manner, typically and preferably the amount of oxidant is at least 0.01% by wt. and not more than 5.0% by wt., based on the wt. of starch. Typically and preferably it is within the range of 0.1%–3.0%, by wt. of starch. Most preferably, it is within the range of about 0.3%–3.0%, by wt. of starch.

When the oxidant is a chlorine oxidant, for example a hypochlorite, herein the oxidant level is sometimes defined with respect to available chlorine percent, based on wt. of starch. The term "available chlorine" in connection with hypochlorite oxidants, is a term used to refer to the amount of chlorine, by wt. %, determined to be present when titrated in accord with a procedure such as that described in the Chlorine Institute Pamphlet 096 Sections 4.3 and 4.5. When defined in this manner, preferred oxidation conditions are those using at least 0.005% available chlorine by wt. of starch, typically at least 0.05% available chlorine by wt. of starch, and preferably not more than 3.0% available chlorine by wt. of starch. Typical and preferred conditions will be about 0.15%–1.5% available chlorine, by wt. of starch. Defining oxidant level by available chlorine level is a common practice for oxidations with hypochlorites.

2. The Natural or Synthetic Reactive Polymer Component—Generally

In general, the natural or synthetic reactive polymer component may comprise any polymer or mixture of polymers suitable for, and capable of, forming preferred adducted combinations with the modified starch component. That is, the usable polymers are reactive polymers. In this context, the term "reactive polymer" is meant to refer to polymer components that contain groups capable of reacting with reactive carbonyl groups in the starch, through covalent reaction and not merely ionic interaction, to form adducted combinations; or, to the residue of a polymer component which has already been reacted with the starch component to form an adducted combination.

It should be noted that the characterization above given with respect to "reactive polymer" component does not require reactive polymer to have in fact reacted through covalent interaction. Rather it requires the reactive polymer to include functionality capable of covalent interaction with carbonyl groups in the starch. The level to which such covalent interactions actually occur when the combination is formed, will depend upon the conditions of combination.

Herein the term "natural polymer" and variants thereof, is meant to refer to a polymer derived from a natural polymer source, for example, a plant or animal source. The term "natural polymer" is meant to include within its meaning such polymers which have been modified by various processing steps, from the natural state. In this context, the processing steps may be chemical, biochemical, or mechanical steps. For example, the term "natural polymer" includes glutens and modified glutens.

Herein the term "synthetic polymer" and variants thereof, without more, is meant to have its ordinary meaning in the polymer art; i.e., a non-natural polymer typically prepared by polymerizing smaller molecules.

In general, to be reactive, the polymer should comprise one or more functional groups capable of reacting with carbonyl (for example, aldehyde) functionality in the starch. Included among these functional groups are reactive amine groups. Typical reactive amine groups are primary amine groups, although secondary amine groups will also be reactive in some situations. In general, tertiary amine groups and quaternary amine groups are not reactive within this definition.

The polymer may also include groups capable of interacting ionically with carboxyl groups in the starch during adduct formation. A variety of groups are capable of doing this, including primary and secondary amine groups, protonated amine groups, tertiary amine groups, and quaternary groups. Of course, a polymer group which is only capable of interacting with a starch through an ionic interaction is not a carbonyl-reactive functionality, or aldehyde-reactive functionality, within the meaning of those terms as used in this disclosure.

The starch/polymer combination can be provided by merely mixing together a starch component as defined and a polymer component as defined. Such a mere mixing will result in a combination which is not an adducted combination, however, unless appropriate conditions are provided during the step of combination, or in follow up treatment.

In order to ensure an adducted combination, generally appropriate conditions of heat, and intimate interaction, are required. Conditions usable to accomplish this are provided herein, and are also apparent from the experiments. It is noted that if the combination is merely a mixing of the components, such a combination will be subjected to adequate conditions to result in a reacted combination or adducted combination, if the mixture is introduced into a papermaking process through a typical starch cooking operation, such as a jet cooker.

It is expected that after subjection to starch cooking conditions, combinations according to the present disclosure would include at least the following: reacted starch/polymer combinations; non-reacted starch; and, non-reacted polymer. That is, the term "adducted combination" is not meant to refer to a composition which only comprises molecules resulting from reactive associations between the starch and the polymer; non-reacted materials, for example, may also be present.

Typical preferred natural or synthetic polymer components will be polymers comprising reactive primary amine groups.

B. Preparation of the Starch Component

A preferred method for preparing the starch component is by oxidizing starch in a slurry, for example in an aqueous medium.

One preferred approach is to oxidize natural starch with oxidizing agent selected from the group consisting of: periodate(s); hypochlorite(s); ozone; peroxide(s); hydroperoxide(s); hydrogen peroxide; persulfate(s); percarbonate(s); and, mixtures thereof (with or without catalyst). Examples of usable agents include: sodium periodate; potassium periodate; sodium hypochlorite; calcium hypochlorite; hydrogen peroxide; sodium persulfate; ammonium persulfate; and potassium persulfate. The more preferred agents are sodium periodate, potassium periodate, sodium hypochlorite and calcium hypochlorite. Preferred amounts were characterized above.

As indicated to above, when the oxidation is a hypochlorite oxidation, the starch will be rendered lightly negatively charged, since hypochlorite oxidations do generate carboxyl groups, as well as carbonyl groups. However, when the oxidation is a periodate oxidation, in general the starch will not become lightly negatively charged, since periodate oxidations of starch typically only generate carbonyl groups and not carboxyl groups.

The preferred oxidizing agents are the hypochlorites. In certain preferred processing, for example, when the oxidant is a hypochlorite, the conditions under which the starch is oxidized will typically be alkaline. Typical conditions would be a solution having a pH ranging from about 7.5 to 13, preferably 7.5 to 12, most preferably about 8 to 11. The conditions can be rendered alkaline by, for example, using NaOH as a base to buffer the system.

After oxidation, if desired, the oxidized starch can be isolated from the reaction mixture and be dried to a product which has nearly the same particle diameter as the natural starch before the oxidation. However, as shown in Experiment 24, it is also possible to directly react the oxidized starch with the natural or synthetic polymer component, without isolation of the oxidized starch from the reaction slurry resulting from the oxidation reaction.

The oxidation reaction can be conducted at a variety of starch concentrations and under a variety of conditions. For typical processing, preferably the temperature of the oxidation is maintained below a gelatinization temperature of the starch. The gelatinization temperature is the temperature at which the birefringence of the starch grain disappears. For a typical natural starch, the gelatinization temperature would be within the range of about 55° C. to 70° C. For typical processing, the oxidation of the natural starch will be carried out at a temperature no higher than about 55° C., typically within the range of 10° from 55° C. Preferred oxidations are conducted with temperatures no greater than about 40° C., and typically within the range of 20° C.–40° C., inclusive.

Typical reaction conditions will be selected to complete the oxidation by a total or near total consumption of the oxidizing agent, preferably within a period of no greater than about 24 hours, typically within a time period of seconds to several minutes. A wide variety of starches from natural sources, or processed after being derived from natural sources, can be used. Indeed, the starch material may be derived from root, tuber, or cereal starch sources. Examples of usable starches include maize (corn) starch, wheat starch, potato starch, rice starch, tapioca starch, sorghum starch, sago starch, cassava starch, waxy maize starch, and mixtures of these starches. According to certain preferred applications, generally in accord with procedures described below, maize or wheat starch, or mixtures thereof, or starch mixtures including at least 70% by wt. of maize and/or wheat starch, are preferably used. The starch material may be chemically, physically, or enzymatically modified, from its natural state. However, it is advantageous that the process can be conducted with natural starch. An example of this is use of maize starch obtained directly from corn wet milling, without modification, and thus without significant added cost.

C. The Polymer Component

In general, the polymer component may be either natural polymer(s), synthetic polymer(s) or mixture(s) thereof. As indicated above, the required characteristic of the polymer component is that it at least comprises groups capable of reaction with carbonyl groups (aldehyde or ketone) in the starch component, through covalent interaction, to form the adducted combination. Such polymers will generally be referenced as polymers that contain carbonyl-reactive functionality, or more specifically as containing aldehyde-reactive functionality. In some instances, they may be referred to as "reactive polymers." Preferred carbonyl-reactive (or aldehyde-reactive) functionalities comprise reactive amine groups. Typical reactive amine groups are primary or secondary amine groups. In general, it is believed that primary or secondary amine groups are reactive with carbonyl groups in the oxidized starch, through formation of imino groups, i.e., Schiff bases.

Consistent with the above, then, typical natural or synthetic polymers usable to form adducted combinations according to the present invention are ones which include, within the polymer molecules, a sufficient amount of functionality to form the bond (covalent) with the oxidized starch molecule. These reactive groups, again typically primary and/or secondary amine groups, can be bonded directly to the polymer backbone, or they may be substituents on groups dependent from the polymer backbone.

The polymer component may comprise a homopolymer, (i.e., a polymer formed from a single monomer), or they may comprise a copolymer (i.e., a polymer formed from more than one monomer). The polymer component can be a mixture of such polymers.

The specific amount of reactive groups for the starch component found in each polymer molecule, on average, is not critical. In general all that is required is that the polymer have enough reactivity for the conditions of reaction with the starch component.

Suitable synthetic polymers include polymers consisting of, or at least containing, monomer residue units of vinyl amine. Herein, in this context, the term "monomer residue units of vinyl amine" or variants thereof, is meant to refer to a polymer which has in its backbone: (a) residues resulting from reaction, in polymer formation, of a vinyl amine; or, (b) a group structurally equivalent to one which would result from using a vinyl amine as a monomer. By the latter, it is meant that the unit may have derived from a different reactant, but which is in the chemical form of a vinyl amine residue unit. A preferred such polymer is a polyvinylamine (PVAm) (or a copolymer of vinylamine monomers or oligomers), typically having an average molecular weight of at least about $1 \times 10^3$ gram/mol, preferably of at least about $1 \times 10^3$ gram/mol and up to $30 \times 10^6$ gram/mol. Preferred such polymers are ones having a charge density of about 10–15 meq/g (milliequivalents/gram). In this context, "charge density" means amount of positive charges per gram of polymer.

Polymers belonging to this group are known for example from U.S. Pat. Nos, 4,421,602 and 4,444,667 (incorporated by reference). They are obtainable by homo or copolymerization of N-vinylformamide and hydrolysis of these copolymers with acids or bases or enzymatically. During hydrolysis the formyl group of the homopolymers of N-vinylformamide or of the copolymers of N-vinylformamide is split off under formation of a primary amino or ammonium group. The N-vinylformamide units in the polymers can be partially or completely hydrolyzed. The degree of hydrolysis can be 1 to 100, preferably 5 to 100 or 10 to 95%. If a homopolymer of N-vinylformamide is hydrolyzed at a degree of 100%, the polymer obtained is polyvinylamine. If the hydrolysis is carried out partially, the polymer obtained contains N-vinylformamide units and vinylamine units depending of the degree of hydrolysis.

Polymers containing monomer residue units of vinyl amine are also obtainable from copolymers of N-vinylformamide with one or more comonomers and hydrolysis of the copolymers. The degree of hydrolysis of the polymerized N-vinylformamide may the same as specified above for hydrolysis of the homopolymers of N-vinylformamide. Suitable comonomers are, for example, vinyl esters of saturated carboxylic acids of 1 to 6 carbon atoms, e.g., vinyl formiate, vinyl acetate, vinyl propionate and vinyl butyrate, esters of ethylenically unsaturated mono or dicarboxylic acids containing 3 to 6 carbon atoms, e.g., methyl acrylate, methyl methacrylate, ethyl acrylate, ethyl methacrylate, isopropyl acrylate, n-butyl acrylate, isobutyl acrylate, hydroxyethyl acrylate, hydroxybutyl acrylate, hydroxybutyl methacrylate and monoesters of acrylic and methacrylic acid with polyalkylene glycols having a molecular weight of from 200 to 10,000 preferably 400 to 2,000. Further examples of suitable monomers are esters of the said acids with aminoalcohols such as dimethylamino ethyl acrylate, dimethylamino methycrylate, dimethylaminopropyl acrylate and dimethylaminopropyl methacrylate.

Other suitable comonomers are unsaturated amides such as acrylamide, methacrylamide and N-alkylmonoamides and N-alkyldiamides having alkyl radicals of 1 to 6 carbon atoms, e.g., N-methylacrylamide, N,N-dimethylacrylamide, N-methylmethacrylamide, N-elhylmethacrylamide, N-isopropylacrylamide, N-n-propylacrylamide and basic acrylamides such as dimethylaminoethylacrylamide, dimethylaminomethacrylamide, dimethylaminopropylacrylamide and dimethylaminopropylmethacrylamide.

Other suitable comonomers are vinyl ethers having alkyl groups of from 1 to 18 carbon atoms, e.g., methyl vinyl ether, ethyl vinyl ether, n-propylvinyl ether, isopropyl vinyl ether, n-butyl vinyl ether, n-pentyl vinyl ether and n-hexyl vinyl ether, or vinyl ethers having aromatic substituents such as phenyl vinyl ether or benzyl vinyl ether.

Other suitable comonomers are N-vinyl pyrrolidone, D,-vinyl caprolactam, acrylonitrile, methacrylonitrile, N-vinylimidazole and substituted N-vinylimidazoles such as N-vinyl-2-methylimidazole, N-vinyl-4-methylimidazole and N-vinyl-2-ethylimidazole, N-vinylimidazoline, N-vinyl-2-methylimidazoline and N-vinyl-2-ethylimidazoline. N-vinylimidazoles and N-vinylimidazolines are used not only in the form of the free bases but also in a form neutralized with mineral acids or with organic acids or in quaternized form, quaternization preferably being carried out with dimethylsulfate, diethylsulfate, methyl chloride or benzyl chloride.

The molar mass of preferred usable polymers containing the residues of vinylamine monomers are, for example, from 1,000 to 10 million, preferably form 5,000 to 5 million (determined by light scattering). This molar mass corresponds, for example, to K values of from 5 to 300, preferably from 10 to 250 (determined according to H. Fikentscher in 5% strength by weight aqueous sodium chloride solution at 25° C. and at a polymer concentration of 0.5% by weight). The polymers containing the residues of vinylaine monomers are preferably used in salt-free from. Salt-free solutions of such polymers can be prepared, for example, from the salt-containing solutions which for instance are obtained by hydrolysis of N-vinylformamide units containing polymers with acids such as hydrogen chloride or sulfuric acid, with the aid of ultrafiltration through suitable membranes with separation limits of, for example, 1,000 to 500,000, preferably from 10,000 to 300,000 dalton.

If desired, the copolymers may also contain additionally polymerized monomer units having at least two ethylenically unsaturated double bonds. Such monomers are usually used in the copolymerization as crosslinking agents. Thus, N-vinylformamide or mixtures of N-vinylformamide with 1 to 99 mol % of other monoethylenically unsaturated monomers can be additionally copolymerized with at least one crosslinker in an amount of from 0 to 5 mol %.

The above polymers of N-vinylformamide are hydrolyzed to form polymers containing vinylamine units. Preferred polymers of this group are homopolymers of vinylamines and hydrolyzed copolymers of N-vinylformamide and vinylacetate containing vinyl amine units and vinyl alcohol units. The vinyl alcohol units are formed by hydrolysis from vinylacetate units contained in the polymer.

Other suitable polymers containing the residues of vinylamine monomers are obtainable from polymers containing N-vinylformamide grafted on polysaccharides or polyalkylene glycols. The N-vinylformamide grafted polymers are hydrolyzed under formation of vinylamine units containing polymers. The polymers belonging to this group are known for example from U.S. Pat. Nos. 5,334,287, 6,048,945 and 6,060,566 (incorporated by reference). Usually per 100 parts by weight of starch, a polyalkylene glycol such as polyethylene glycol, polypropylene glycol or block polymers of ethylene and propylene glycol, or a vinylester are grafted with from 0 to 100, preferably from 5 to 95 parts by weight of N-vinylformamide and are then completely or partially hydrolyzed.

Other usable polymers which contain reactive amino groups are polyethyleneimines. They are prepared, for example, by polymerizing ethyleneimine in aqueous solution in the presence of acid-eliminating compounds, acids or Lewis acids. Polyethyleneimines have, for example, molar masses of up to 2 million, preferably 200 to 500,000. Polyethyleneimines having molar masses of from 500 to 100,000 are particularly preferably used. Water soluble crosslinked polyethyleneimines which are obtainable by reacting polyethyleneimines with crosslinking agents such as epichlorohydrin or bischlorohydrin ethers of polyalkylene glycols with from 2 to 100 ethylene oxide and/or propylene oxide units or blockpolymers containing blocks of units of ethylene oxide and propylene oxide are also suitable.

Suitable amino- and/or ammonium-containing polymers also include polyamidoamines grafted with ethyleneimine. These polymers can be obtained, for example, by first condensing dicarboxylic acids with polyamines and then grafting the polyamidoamines thus obtained with ethyleneimine. Suitable polyamidoamines are obtainable by reacting dicarboxylic acids of 4 to 10 carbon atoms with polyalkylenepolyamines which contain from 3 to 10 basic nitrogen atoms in the molecule. Examples of suitable dicarboxylic acids are succinic acid, maleic acid, adipic acid, glutaric acid, sebacic acid and terephthalic acid. In the preparation of the polyamidoamines, it is also possible to use mixtures of dicarboxylic acids as well as mixtures of a plurality of polyalkylenepolyamines. Suitable polyalkylenepolyamines are, for example, diethylenetriamine, triethylenetetramine, tetraethylenepentamine, dipropylenetriamine, tripropylenetetramine, dihexamethylenetriamine, aminopropyl ethyl endiamine and bisaminopropylethylenediamine. For the preparation of the polyamidoamines, the dicarboxylic acids and polyalkylenepolyamines are heated to relatively high temperatures, for example, to temperatures of from 120 to 220° C., preferably from 130 to 180° C. The water formed in the condensation is usually removed from the system. In the condensation it is also possible to use lactones or lactams of carboxylic acids of 4 to 18, preferably 6 to 12 carbon atoms. For example, from 0.8 to 1.4 mol of polyalkylenepolyamine are used per mol of dicarboxylic acid. The polyamidoamines thus obtained are grafted with ethyleneimine using for example, per 100 parts by weight of polyamidoamine 1 to 50 parts by weight of ethyleneimine. The grafting of the ethyleneimine is carried out in the presence of acids or Lewis acids, such as sulfuric acid or boron trifluoride etherates at, for instance, from 80 to 100° C. Polyamidoamines can be crosslinked before being grafted with ethyleneimine. Suitable crosslinking agents are, for example, epichlorohydrin, bischlorohydrinethers of polyalkyleneglycols and bisepoxides of chlorohydrinethers of polyalkyleneoxides. Compounds of this type are described for example in DE-E-24 34 816.

Polyallylamines are also suitable synthetic reactive polymers. Polymers of this type are obtained by homopolymerization of allylamine, preferably in a form neutralized with acids or in quaternized form or by copolymerization of allylamine with other monoethylenically unsaturated monomers which are described above as comonomers for N-vinylforamide. The K values of these polymers is of from 30 to 300, preferably from 100 to 180 (determined according to H. Fikentscher in 5% strength by weight aqueous sodium chloride solution at 25° C. and at a polymer concentration of 0.5% by weight). At a pH of 4.5, they have, for example, a charge density of at least 4 meq/g of polyelectrolyte.

Other suitable cationic synthetic polymers having reactive amino groups are polylysines. Such polymers are obtained by condensing lysine alone or together with other compounds such as amines or lactames. Compounds of this type are disclosed in U.S. patent application Ser. No. 09/13123 (incorporated by reference).

Further synthetic polymeric compounds containing reactive amino groups are polymers containing aminoethyl acrylate units and polymers containing aminoethyl methacrylate units. Aminoethyl acrylate and/or aminoethyl methacrylate may be polymerized alone or in combination or together with other monoethylenically unsaturated monomers. The molecular weight of the polymers is, for example, of from 1,000 to 5 million, preferably of from 5,000 to 500,000.

Other suitable cationic synthetic polymers having reactive amino groups are condensation products of piperazine, 1-(2-aminoethyl)piperazine, 1,4-bis(3-aminopropyl)piperazine and mixtures thereof with crosslinkers. The condensation reaction is carried out in an aqueous medium. Condensation products of this type are disclosed in U.S. Pat. No. 6,025,322 (incorporated by reference).

Dendrimers containing reactive amino groups are also suitable for the production of polymer modified starches of the present invention.

D. Formation of the Starch/Polymer Combination

As indicated above, it is postulated that when the adducted combination is formed from a reactive carbonyl containing starch (typically an oxidized starch) and a polymer comprising reactive groups, for example primary or secondary amino groups, the adducted combination at least in part results from formation of imino groups, i.e., formation of Schiff bases. Such an interaction would be a covalent interaction. It is also postulated that when the starch is one which also includes anionic groups such as carboxyl groups, then typically an additional interaction will occur with the polymer, i.e., an ionic interaction, since the types of polymers characterized above are generally cationic polymers.

Both covalent and ionic interactions will be present in many typical starch/polymer combinations according to the present disclosure, provided both reactive carbonyl moieties (typically aldehyde moieties) and anionic (carboxyl) moieties are present in the starch from which the combination is formed. However, in general, it has been observed, as demonstrated in the experiments, that the presence of at least some carbonyl (typically aldehydic) component in the starch, capable of covalent interaction with a polymer, is preferred.

Typically and preferably the amount of reactive polymer provided in the combination is no more than about 5.0%, by wt. of starch, typically at least 0.1%, and generally within the range of 0.5 to 2.5%. In this manner, although the starch is modified with respect to its interactive characteristics with the paper and with respect to its behavior in the papermaking process, it is readily handleable in the same manner as conventional starch additives.

As indicated above, the oxidized starch can be isolated from the oxidation reaction, before reaction with the polymer. Also as indicated, however, if desired after oxidation, the slurry of the oxidized starch can be directly reacted with the synthetic polymer. This latter approach may be convenient, if it is desired to carry out the formation of the adducted combination in the same apparatus as that in which the starch slurry was oxidized; for example by adding the cationic polymer to the aqueous solution, after the oxidation. A typical approach would be to (a) add reactive polymer to the slurry, (b) raise the temperature of the slurry up to at least the boiling point of water, and, (c) after sufficient reaction time, isolate the adducted combination or polymer modified natural starch, by spray drying or spray-granulation, with the resulting solid (adducted combination) being separated in a conventional manner, for example, by cyclonic separation (i.e., in a cyclone).

The reaction to form the adducted combination can be conducted in a variety of equipment configurations and types, for example by providing a mixture of the aqueous slurry of oxidized starch with the polymer in a digester, a pressure resistant stirred vessel, an autoclave, or a kneader of an extruder. The reaction can be carried out batchwise or continuously. A jet digester (cooker) will typically be used. This can be done by continuously feeding an aqueous mixture of oxidized natural starch and polymer to a jet digester; however, alternatively an aqueous slurry of oxidized starch and separately an aqueous solution of a polymer can be introduced continuously into the jet cooker or digester. Typically, it will be preferred to at least have mixed the polymer solution with the aqueous starch slurry in a mixing chamber before introducing them into the jet digester. The mixing chamber used for the (turbulent) mixing may be, for example, a binary or multi-medium nozzle. The conditions can be selected such that the residence time of the substances to be mixed will be, for example, from 0.08 to 1 second, preferably from 0.1 to 0.5 second. After leaving the mixing chamber, the mixture would typically be directed through a digester, which may be, for example, a heating coil which would be kept at the reaction temperature with the aid of an oil bath. The reaction product could then let down via a pressure limiter and be cooled to about room temperature.

The reaction temperatures for forming the adducted combination will typically be within the range of 80° to 1 80° C., preferably 110° to 160° C. and in most instances will be within the range of 120° to 150° C. At temperatures of the reaction mixture above 100° C., the reaction will typically be carried out under pressure.

In general, under the preferred conditions identified in the previous paragraph, the reaction of the starch with the polymer will be carried out over a period of from 5 second to several hours, typically from 10 seconds to 20 minutes, depending on the specific temperature. The reaction can usually be effected at up to 180° C. under pressure conditions of up to 10 bar, but may also be carried out at above 10 bar, for example at from 11 to 80 bar and above the gelatinization temperature of the starch. The polymer modified starch is typically obtained in the form of particulate aggregates dispersed in water. The particulate structure of the starch polymer complexes generally leads to milky opacity of the reaction product. The size of the particulate aggregates (i.e., the mass median particle diameter) will typically be, for example, 0.1 to 100 µm, usually within the range of 1 to 45 µm. The mass median particle diameter of the polymer modified starch will be, in most cases, within the range of 2 to 35 µm. The mass median particle diameter of the polymer modified starches can be determined with the aid of static light scattering, for example, with an apparatus provided by Coulter Corporation, Miami, Fla.

II. Use of the Adducted Combination as a Paper Additive

Polymer modified starch compositions according to the present disclosure are usable is wet end additives in papermaking processing. In general, they would be used in place of conventional starch or modified starch additives. However, they can be used in manners that provide significant advantage.

First, their characteristics are such that they can be effectively used in rather significant amounts, without undesirable effects with respect to drainage, commonly seen with many starch additives.

In addition, they can be used in manners achieving relatively high starch retention, with conventional equipment and processing techniques.

Indeed, the nature of the polymer modified starch additives according to the present disclosure is such that they can be incorporated in relatively high amounts, in a wet end process, without undesirable effects on paper processing, such as creating inefficiency or slower processing. For example, the starch additives according to the present disclosure can be incorporated in amounts on the order of 2%–9%, by wt. based on dry wt. of resulting paper.

Indeed, it has been found that in some instances the amount of starch modifier that can be provided in the paper at the wet end of the process, using a polymer modified starch additive according to the present disclosure, is so high, for example at or above 4%, (or typically at or above 6%) by wt. of paper, that a size press operation downstream from the wet end processing, can be entirely eliminated from the papermaking process. This can be highly advantageous, in terms of production efficiency for a papermaking process. This can be especially helpful in papermaking processes that involve the utilization of relatively high amounts of recycled fiber materials.

In general, polymer modified starch compositions according to the present invention can be incorporated in the wet end of a papermaking process utilizing conventional techniques and processing equipment. It is noted, again, that modification from standard techniques can be implemented, if desired, to obtain relatively high amounts of starch inclusion in the wet end process, if desired, to an effect high enough to avoid the use of a size press operation.

In some instances, the polymer modified starch material will be prepared and shipped as a commodity to the papermaking facility. In general, this will be referred to as a one component process. In other instances, the starch component and the polymer component will be reacted at the papermaking facility, typically in the jet cooker or similar starch cooking operation, prior to addition to the wet end of the papermaking process. Two variations in this approach would typically be used. In a first, a one component process, the starch/polymer combination would be pre-made and shipped to the papermaking facility, but not be pre-reacted, by merely mixing the two components together and providing a mixture fed into the starch cooking operation which has conditions appropriate to facilitate reaction between the starch component and the polymer component. For the second, the starch component and the polymer component would not be pre-mixed, but would be fed into the starch cooking process of the papermaking facility separately, with reaction occurring in the starch cooking operation, typically in a jet cooker.

In general, the principles described herein also relate to paper products characterized by presence therein of a paper modifying effective amount of a polymer modified starch composition as characterized herein. In general, the term "paper modifying effective amount" may be used as a reference to an amount of component adequate to provide modification of paper properties, relative to its absence. Typical paper properties that can be monitored for this effect would be burst strength or tensile strength.

In typical applications, the amount of polymer modified starch composition included would be at least about 1% by dry wt. paper, typically 2%–9% by wt. based on dry wt. of paper.

In the context of referring to the amount of polymer modified starch composition included in the wet end of a papermaking process, or the paper on a wt. percent of dry paper wt., reference is meant to a theoretical calculated wt. percent of the polymer modified starch composition or additive, assuming all starch particles are covalently interacted with polymer molecules. It is recognized that the polymer modified starch composition, as indicated above, could well comprise a mixture of: unreacted starch; unreacted polymer; only ionically reacted starch/polymer; and, starch/polymer combination which has been at least covalently interacted.

The identified compositions for the production of paper are preferably used as dry strength agents. Known paper, paperboard and cardboard qualities, for example writing, printing and packaging papers can be produced. The papers may be produced from a large number of different fiber materials, for example from sulfite or sulfate pulp in the bleached or unbleached state, groundwood, waste paper, thermomechnical pulp (TMP) and chemothermomechanical pulp (CTMP). The pH of the stock suspension is typically from 4 to 10, preferably from 6 to 8.5. The dry strength agent may by used both in the production of base paper for papers having a low basis weight (LCW papers) and for cardboard. The basis weight of the papers is typically from 30 to 200, preferably from 35 to 150 g/m$^2$, while that of cardboard may typically be up to 600 g/m$^2$. The dry and wet strength agents can also be applied to the surface of paper to improve paper strength. Compared with papers produced in the presence of an equal amount of natural starch, the paper products produced according to the current disclosure can be produced to have markedly improved strength, which can be quantitatively determined, for example, on the basis of one or more of the burst strength, the bursting pressure, the CMT value and the tear strength.

III. Analytical Techniques Provided

According to yet another aspect of the present disclosure there are provided processes for determining the level of modification of a lightly oxidized and/or negatively charged starch comprising one or more of the following tests:
reacting the starch with Tollen's reagent,
reacting the starch with dinitrophenylhydrazine,
titrating the starch with a suitable indicator, preferably phenylphthalein.

According to another aspect of the present invention there are provided processes for determining the presence and/or relative amount of carbonyl groups in oxidized starch comprising the steps of:
(a) exposing the starch to a carbonyl group marker, typically an aldehyde marker, preferably fluorescein-5-thiosemicarbazide; and, subsequently,
(b) analyzing the starch for the presence of marked carbonyl groups by one or more of the following types of analyses:
CLSM chemical imaging,
Raman chemical imaging, and
SEM imaging.

IV. General Procedures

In this section, the parts and percentages reported are by weight, unless otherwise indicated.

A. General Principles and Observations Regarding Starch Treatments and Starch Analyses
1. Starch Treatments
1.1 Hypochlorite Oxidations For a typical hydrochlorite oxidation, the starch is oxidized in an environment, wherein the available chlorine is about 0.005 to about 3% available chlorine by weight of starch, preferably 0.05 to about 2% available chlorine by weight of starch, and preferably more from about 0.15 to about 1.5% available chlorine by weight of starch. During a typical hypochlorite oxidation, in an aqueous medium, the pH range of the suspension is maintained from 2 to 12. As will be seen from experiments below, in some instances the oxidation is conducted under alkaline conditions, by conduct in an NaOH solution. A typical hypochlorite oxidation is conducted at a temperature within the range of 10° to 50° C.

1.2 Periodate Oxidations

For a typical periodate oxidation, the starch is oxidized, for example in an aqueous environment, wherein the periodate is present at about 0.01%–5% by weight of starch, preferably 0.1 to about 3 wt. %, even more preferred 0.3 to about 3 wt. % periodate by weight of starch; with a pH range of the suspension within the range of 1–8; and, at a temperature within the range of 10–50° C.

2. Starch Analyses
2a Brabender Viscosities

For Brabender viscosity measurements, the starch slurry is heated in a Brabender viscoamylograph under constant rate of shear (75 rpm) and the increase of viscosity is measured as torque (BU) on the spindle and a curve is traced. The temperature profile is as follows: start temperature at 50° C.; rate of heating 1.5° C./minute until a temperature of 93° C. is reached (phase 1) and holding the temperature at 93° C. or 30 minutes (phase 2). Subsequently, the cooling starts at a rate of 1.5° C./minute until a temperature of 50° C. is reached (phase 3) and holding at 50° C. for 30 minutes (phase 4). The viscosity is measured during this temperature program. Peak viscosity is the maximum viscosity of the first peak in phase 1. Hold viscosity is the viscosity at the end of the hold time of 30 minutes at 93° C., phase 2. The setback is the viscosity at the end of the cooling period (phase 3) at 50° C. (=the start of the hold at 50° C., phase 4).

The data reported in Tables A and B below for various modified starches were measured at pH 4.5 at a starch slurry concentration of 7%. In the tables, BU means Brabender Units.

TABLE A

| Hypochlorite Oxidized Starches Brabender Unit | | | |
|---|---|---|---|
| Oxidized Starch | Peak (BU) | Hold (BU) | Set Back (BU) |
| Corn starch, 0.1% available Cl | 510 | 485 | 985 |
| Corn starch, 0.5% available Cl | 370 | 300 | 685 |
| Corn starch, 1% available Cl | 120 | 65 | 230 |

TABLE A-continued

Hypochlorite Oxidized Starches Brabender Unit

| Oxidized Starch | Peak (BU) | Hold (BU) | Set Back (BU) |
|---|---|---|---|
| Wheat Starch, 0.1% available Cl | 55 | 60 | 150 |
| Wheat Starch, 0.5% available Cl | 15 | 20 | 70 |
| Wheat Starch, 1% available Cl | 5 | 10 | 35 |

The procedure used for preparation of the Table A examples, is that described for hypochlorite oxidation in Experiment 1 below, except modified for the amount of available chlorine, as defined.

TABLE B

Periodate oxidized starch

| Oxidized Starch | Peak (BU) | Hold (BU) | Set Back (BU) |
|---|---|---|---|
| Corn starch, 0.01% NaIO$_4$ | 483 | 306 | 740 |

For the example in Table B, the procedure of Experiment 2 below was used.

2b Carboxyl and Carbonyl Bulk Analyses

In general, carboxyl and carbonyl bulk analyses of modified starch are conducted by following the Experiment 7 and 8 procedures described below. In Table C, measurements of carboxyl and carbonyl presence, in modified corn starches, are reported. The carboxyl measurements were taken using the potentiometric technique of Experiment 8, converted to microequivalents. The carbonyl measurements were by the Tollen's test, Experiment 7a.

TABLE C

Carboxyl and Carbonyl bulk analyses of modified starch

| Corn Starch Treated With: | Carboxyl (μeq/g) | Carbonyl (μeq/g) |
|---|---|---|
| 0.5% available Cl (hypochlorite) | 10 | 40 |
| 1% available Cl (hypochlorite) | 20 | 65 |
| 1% NaIO$_4$ | — | 90 |
| 0.3% Chloroacetic acid | 15 | — |

The first two oxidations identified in Table C above (i.e., at 0.5% available Cl and 1% available Cl) were hypochlorite oxidations conducted in accord with the procedure of Experiment 1 below, except where necessary adjusted for the amount of available chlorine presence. The sodium periodate oxidation, was conducted in accord with the procedure at Experiment 2 below, except modified for % oxidant. The chloroacetic acid procedure, is a carboxymethylation procedure reported below at Experiment 3. It is noted that the hypochlorite procedure generates both carboxyl and carbonyl groups. The sodium periodate oxidation, on the other hand, does not result in oxidation to carboxyl groups, but only to carbonyl groups. The chloroacetic acid procedure is not an oxidation at all, but rather is an "effective oxidation" to only provide carboxyl, since the result is the addition, to the starch, of a moity (i.e., carboxymethyl group), which itself carries the carboxyl group, but no carbonyl.

2c Particle Size Distributions

In some instances, the mass median particle diameter of the polymer modified starch was determined with an apparatus LS 130 of Coulter Corporation, Miami, Fla. 33196. The principles of measurement are described in handbook of product no. 4237214A, chapter 4 (1994) of Coulter Corporation. The measurements were carried out at a wavelength of 750 nm in aqueous solution having a solids content of 0.002% by weight of polymer modified starch. The optical model of Fraunhofer diffraction was used to calculate the particle size distribution from the light scattering profile.

In other instances the mass median particle size diameter of the polymer modified starch was determined with a Malvern Master Sizer 2000 (APA 2000). The measurements were carried out at wavelengths of 632.8 and 450 nm in aqueous soln.

In the experiments, particle size distributions measured with the Melvern Particle Sizer for the adducted combinations, after cooking, were typically in the range of 0.1 to 12 micrometers.

B. Some Observations Regarding a Particular Polymer Modified Starch

As the result of investigations conducted thus far, a preferred polymer modified starch composition, for utilization as a paper additive, is a combination of starch and a polyvinylamine (PVAm). A specific such additive, described below, is an adducted combination of: (a) starch which has been oxidized with 0.5% available chlorine by wt. of starch (Cargill product C1500); and, (b) polyvinylamine (PVAm); the particular preferred PVAm being as described below at Experiment 5, for Polymer 1.

Preferred such combinations have been found to be ones wherein the amount of polymer combined is about 0.5–2%, by wt. of starch component combined.

C. General Manufacturing Procedures for Polymer Modified Starch Usable, for Example, in the Paper Industry As characterized more briefly above, a result of the investigations conducted, two general approaches to preparing polymer modified starch, for example, for use in the paper industry, have been developed. Herein the two general approaches are: one component approaches; and, two component approaches. In general, in a one-component approach, the combination of starch and polymer is prepared prior to shipment to the paper mill or entering into the papermaking process. Two component approaches including bringing the starch and the polymer to the paper mill separately from one another and combining them at the paper mill.

Herein, two general approaches to one component systems are described. In the first, the combination of modified starch and polymer is provided as an adducted or reacted combination, for example in accord with the definitions provided above. In the second, the combination of the modified starch and polymer is provided in a mixed form of the materials, unreacted, but in a form that will react to form adducted or reacted combination when appropriately introduced into processing in a paper mill, for example when introduced into a jet cooker. Variations in these two general types of one component approaches are provided in more detail, below.

For a two component approach, typically the polymer and the starch are directed into the papermaking operation separately, and the polymer modified starch is prepared in the papermaking process. An example of this was characterized above, for example in the description wherein separate streams of polymer and starch were described as directed into a jet cooker, and reacted in the jet cooker to create the adducted combination.

One Component Manufacturing Procedures

During the present investigations, several different categories of one component manufacturing procedures were defined. In general, the different approaches are characterized with respect to the state of the oxidized starch, or the state of the polymer (typically PVAm), introduced into the procedure to form the combination, prior to introduction of the combination into a papermaking process. For many of the procedures, the definitions turn on the amount of solids (versus water) in each of the two components that are adducted, to form the adducted combination.

In general, five general procedures have been defined as follows:

1. Wet-wet procedure;
2. Semi dry-wet procedure;
3. Dry-wet procedure;
4. Dry-dry procedure; and
5. Pre-gel procedure.

In procedures 1–4 in the above list, the first characterization refers to the state of the starch component (typically oxidized starch) prior to mixing with the polymer to form the combination; and, the second characterization refers to the state of the polymer (typically PVAm), prior to mixing to form the combination. As will be apparent from the following, procedures 1–3 form adducted combinations. However, procedure 4 forms a non-adducted combination; i.e a mixture which is in an appropriate form to react to an adducted combination, when appropriately treated for example during a papermaking operation.

In the following table, examples of procedures 1–4 are provided with an indication of the water contents and the state of the materials or components mixed, to form the combination.

TABLE D

| Category Of Modification | Example of Oxidized Starch[2] Component Stated as % Starch Solids by wt. (remainder being water) | % of PVAm[2] (by wt.) |
|---|---|---|
| wet - wet | 40% (slurry) | 20% (solution) |
| semi-dry - wet | 66% (filter cake) | 20% (solution) |
| dry - wet | 89% (dried product) | 20% (solution) |
| dry - dry 89% | (dried product) | 90% (dried product) |

[1]The oxidized starch component could be, for example, made in accord with Experiment 1.
[2]The PVAm components could be, for example, in accord with Experiment 5.

Herein the term "wet" when used in reference to the starch component, refers to a slurry which contains less than 50% starch solids (dry wt.). A PVAm/water combination is referenced as "wet" if the PVAm is in solution. As an example, for a wet-wet process, the starch would be oxidized by adding hypochlorite to a 40%, based on dry solids, starch slurry. After starch oxidation, PVAm solution would be added to the starch slurry. To prevent part of the PVAm being lost, the next steps would typically include drying the total system and inducing reaction between the starch and PVAm (for example, with heat) before and/or during drying.

When the slurry is heated, the PVAm and starch will react, to form the adducted combination. This can be observed by a change in viscosity and particle size distribution. Heating the slurry can be a separate step or combined with the drying step. Usable drying steps include, for example drum drying, spray drying, flash drying or ring drying.

From the above, it is apparent that there are a variety of options for conducting a wet-wet process. As a first option, once the mixture of oxidized starch and PVAm solution is made, it can be dried without a separate heating step, using the process of drying to induce reaction. As a second option, once the oxidized starch slurry in the PVAm solution are mixed, there would be separately heated to a temperature below the cooking temperature of the starch. After this, a drying step would be conducted.

As a third option, once the oxidized starch slurry is mixed with the PVAm solution, the mixture would be heated in a reactor (for example, a jet cooker or extruder) to a temperature range of about 40° C. to 180° C., for example, 60° C. to 160° C. and it is foreseen most typically from 100° C. to 150° C. with a follow-up step of drying. The difference between the third and the second options is that the second option would typically be conducted in the slurry tank containing the oxidized starch slurry, whereas the third option involved moving the mixture to a separate reactor and in typical instances would be above the cooking temperature of the starch. The third process is similar to that which would be used in a two-component system, except conducted separately from a papermaking operation.

Herein, the term "semi-dry" when used in reference to the starch composition, is meant to refer to starch composition which has a dry solids content of about 50 to 80%, typically about 66%. Such a composition would typically result from de-watering the oxidized starch slurry resulting from the oxidation process, for example, by filtration or centrifuging, decanting, and/or pressing. A typical approach would be to use a filter press, to generate a filter cake with a dry solids content in the range specified.

In a typical semi-dry wet process, the semi-dry oxidized starch filter cake would be sprayed, with a PVAm solution, for example, in a continuous or batch mixture (usable equipment including, for example, a paddle mixture, a high shear mixture, a plow blade mixture, or a ribbon blender). The mix cake would be dried in a ring dryer or similar dryer. Typical and preferred drying conditions would be with an inlet temperature of about 110–250° C., and an outlet temperature of about 60–65° C. The result would be an adducted combination.

In general, in reference to an oxidized starch composition, the term "dry" is meant to refer to a composition that has a dry solids content of greater than 80%, by wt. Typical compositions will have a dry solids content of 80% by wt. or greater.

An example of preparation of a dry oxidized starch, would be taking a starch slurry prepared, for example, by starch with a hypochlorite in a 40% dry solids starch slurry, and after reaction centrifuging or filtering the slurry to a filter cake of about 66% dry solids modified starch. The starch cake could then be further dried in a dryer (for example, a ring dryer) up to a dry solids content of above 80%, for example, 98%.

The adducted combination would then be prepared by spraying a PVAm solution over the dry starch, followed by another drying step. Spraying and drying can be performed in one step, for example, in a floating or fluidized mixer-dryer combination.

The result of processing described in the three options discussed before, will typically be a one-component system of adducted combinations, in the form of agglomerates. By heat treatment (up to for example 50° C. for ten minutes to several hours) and/or sheared with a high shear mixture, the agglomerates can be disrupted. Disrupted agglomerates are generally easier to cook in a papermaking operation, than agglomerates still intact. However, disruption of the agglomeration is not a necessary step, for use in a papermaking operation.

For the options described thus far, generally the PVAm component is used in solution, and the result after addition to the starch component, and application of heat, its reaction to form the adducted combination. Alternatively, the PVAm can be provided in a dry state, and mixed with the dry starch component. The result will be an unreacted mixture or combination. The combination, however, would be such that the reactive polymer component will react with the oxidized starch, once heat is applied. Thus, the mixture is one which when introduced to the starch cooking step of a papermaking operation, will form an adducted combination.

Pre-gelled Systems

With pregelled systems a one-component system is defined that was heat treated during manufacturing in such a way that the starch was partly or completely gelatinized. It can be theorized that an advantage is that it becomes easier to cook in the paper mill. In some instances, the starch will be sufficiently cooked to be cold water dispersible, and if cold water dispersible, no cooker is required in the paper mill before application.

Storage of the Various One Component Systems; Characteristics and Use

For a typical one-component system, whether it comprises the adducted combination or the dry components mixed together, the optimal storage will typically be between −10° C. to +80° C., preferably at about 10° C.–25° C.

Preferably the one-component system will be maintained at a moisture content of no greater than about 12%, usually about 6 to 12%. Typically, the moisture content will be 9–12%.

In general, the one component system will comprise agglomerates, i.e., starch agglomerates. The agglomerates will be formed by agglomeration of several starch or modified starch granules. The agglomerate sizes are typically 3 to 20 times bigger than the starch granules size. The agglomeration becomes stronger, as the moisture content increases. Thus, agglomeration increases with storage time, especially if humidity is high. If the agglomeration is dispersed in water with shearing and/or heating, the agglomerates can be disrupted. The Brabender viscosity will in general depend on the manufacturing of storage conditions. In Table E below, typical Brabender viscosities for typical one component systems are presented.

TABLE E

|  | peak (BU) | hold (BU) | set back (BU) |
|---|---|---|---|
| one comp. | 400–1800 | 400–1300 | 700–2000 |

D. Use of a One Component System in a Papermaking Operation

As indicated briefly above, in general, one component systems according to the present disclosure can be handled, in the wet end of a papermaking operation, similarly to utilization of conventional starch compositions. Of course, if the one component system used resulted from a dry-dry operation, the chemical interaction to provide the adducted combination would not yet have occurred. With such systems, it can be expected that reaction to the adduct typically will be initiated in a cooking operation as the starch is cooked for use in the papermaking process.

The performance of the composition in paper can be dependent on the particle size distribution of the starch dispersion. By manipulation of the cooking conditions it is possible to obtain a desired particle size distribution and to change the performance in a papermaking operation.

The cooking conditions can be manipulated by changing, for example, residence time in the cooker, temperature, concentration of the starch slurry and shear applied during cooking.

In the typical papermaking process, and to advantage, standard cooking conditions for starch can be utilized, with one component systems according to the present disclosure. Typical conditions will be as follows:

1. Use as the cooking device or reactor, an autoclave, extruder, stern vessel, jet cooker, high shear cooker (for example with a rotating tooth and chamber set), or heat exchanger;
2. Conduct of the cooking operation in either a continuous or batchwise manner;
3. Slurry concentration during cooking of 1–15%, typically 4–12%, preferably 6–10% based on wt. % starch in water; and
4. Cooking temperatures of 80–180° C., typically 100–160° C., preferably 100–150° C., with residence time of ten seconds to thirty minutes, depending on such parameters as temperature, shear, and concentration.

After cooking, if the system is one in which the oxidized starch (or otherwise modified starch) and the PVAm (or other polymer) were not reacted prior to production into the cooking system, the reaction to the PVAm and the starch could be allowed to proceed over a period of time typically, for example, from about five seconds to several hours, preferably with conditions chosen such that the reaction to adduct will be completed within time of from 10 seconds to 20 minutes, and prior to addition of the material to the paper.

It is anticipated that in typical systems prior to addition to the pulp, the polymer modified starch composition will be diluted to a final starch concentration of 0.05–5%, preferably 1–3%.

Of course, the water for the slurry preparation and dilution can be fresh water or water from a closed water system in the paper mill.

E. Utilization of Oxidized Starch and Polymer (For Example PVAm) as a Two Component System in a Papermaking Operation Typically, if utilized in a two component process, the oxidized starch (or otherwise modified starch) and PVAm (or other polymer) are introduced separately into the papermaking operation, for example, through separate introduction into the cooking operation. The cooking can be performed in accord with the conditions described above, in connection with general cooking conditions for one component systems. It will generally be required that the conditions be selected such that adequate time for interaction between the oxidized starch and the PVAm is provided.

In general, there are three options for bringing together the starch and the polymer (PVAm) at the paper mill; these would be before, after, or during cooking of the starch.

If they are brought together before the cooking of the starch, the system would be similar to the process described above for utilization of a dry-dry combination. That is, the materials we brought together, either in slurry or in dry form, and would be provided in an appropriate slurry form for cooking as a starch. In a typical approach, the mixing of the starch with the PVAm (or other polymer) would be in a makeup tank or inline, with the mixing for cooking being conducted within an appropriate time frame for the system management, for example, 0.08 seconds to several hours. It would typically be preferred for a paper mill operation, that the mixing be conducted in a short time frame, for example, 0.1 seconds to 1 minute. The resulting dispersion would then be cooked, and fed to the pulp or, if desired, allowed to react for several hours prior to addition to the pulp.

In the second approach, the PVAm (or other polymer) would be added to the reactor during the starch cooking. The resulting dispersion would then be added to the pulp, or, if desired, allowed to further react, for example, up to several hours before addition to the pulp.

In the third option, the starch slurry would first be cooked, and then the PVAm (or other polymer) solution would be added to it. For this approach, reaction time will typically be 10 sec to 20 min, before addition to the pulp.

V. EXPERIMENTAL

A. Preparation of Starch and Polymer Materials

In this section of the Experimental Presentation, specific experimental examples for the preparation of: oxidized starches; other modified starches used for experimental comparatives; and, polymer components used in selected experiments, are presented.

Experiment 1—Hypochlorite Oxidation of Starch

To a 4-neck 5l round bottom flask fitted with overhead mechanical stirring, a 250 ml equal pressure addition funnel, and a reflux condenser, was added 3.5 liters of fresh starch slurry. This was temperature equilibrated to 30° C. by immersion in a constant temperature water bath. The slurry contained 50 g (grams) of dry starch per 100 ml (milliliters) of slurry to give a total dry solids content of 1750 g. The pH of the stirred reaction mixture was adjusted to 10.5 with 2% NaOH by a dropwise addition through the addition funnel, then 62.5 ml of 14% available chlorine solution was added dropwise over a 15 minute period. The reaction was allowed to proceed for 1 hour after the hypochlorite addition was complete at which time 2 ml of 38% sodium bisulfite solution was added to neutralize any remaining hypochlorite. The reaction mixture was then pH neutralized with dilute hydrochloric acid to 5.5 and placed on a Buchner funnel under vacuum to filter the product to a wet cake. The cake was either air dried as is, or optionally, the cake was washed by pulling a liter of water through the cake, and then air-dried. Analysis of the starch by the methods described below at Experiments 8 and 7a, revealed 10 $\mu$eq/g (microequivalents/gram) carboxyl functionality and 40 82 eq/g aldehydic functionality, on a dry basis.

Experiment 2—Periodate Oxidation of Starch

In a 10 liter glass vessel, 3 kg of native corn starch was suspended in 6 liters of water and stirred with an overhead stirrer. The pH was set at 6. A separate solution was made of 0.3 g $NaIO_4$ (0.01% w/w) in 100 ml of water. This solution was added to the starch suspension. After 1 hr reaction at room temperature (20° C.) the product was filtered on a Buchner funnel and washed with water (10 liters). The pH of the suspension was brought to 4 with HCl. Subsequently the suspension was dried by spray drying with 215° C. inlet temperature and 53° C. outlet temperature giving a dry powder.

Experiment 3—Carboxymethylation of Starch

To a 4-neck 5 liter round bottom flask fitted with overhead mechanical stirring, a 250 ml equal pressure addition funnel, and a reflux condenser was added 3.5 liters of fresh starch slurry. The slurry contained 49 g of dry starch per 100 ml of slurry to give a total dry solids content of 1715 g. The slurry was temperature equilibrated to 30° C. by immersion in a constant temperature water bath, then pH adjusted to 11.7 by a dropwise addition of 7% NaOH in 10% NaCl solution with rapid stirring. After the salt/caustic addition, 5.43 g (0.54 mole %) of chloroacetic acid, sodium salt was added in one portion and the reaction mixture heated to 38° C. and maintained for 60 hours. The reaction was then pH neutralized with dilute hydrochloric acid to 5.0 and the product was filtered on a Buchner funnel under vacuum. The resultant cake was washed with one bed volume of water and then air dried to an equilibrium moisture level. Analysis of the starch by the procedures discussed below at Experiment 8, revealed 15 $\mu$eq/g carboxyl functionality, on a dry basis.

Experiment 4—Reduction of Oxidized Starch

A reduced starch was prepared by reacting an oxidized starch with excess $NaBH_4$ to eliminate active aldehyde and ketone groups in the starch. Carboxyl groups would not be effected by these reaction conditions.

Oxidized starch (200 g) from Experiment 1 was mixed with 1.2 liters of water in a 5 liters round-bottom flask, equipped with a mechanical stirrer. To the mixture, a portion (400 mg) of sodium borohydride ($NaBH_4$, total about 2.4 g) was added, and the mixture was stirred at room temperature for an hour. While stirring, portions of $NaBH_4$ (400 mg) were added every hour. After overnight stirring, acetic acid was added very slowly to the mixture to adjust pH to 10–10.5. After the addition was completed, the mixture was stirred for another 2 hours. More acetic acid was added to the mixture to adjust to pH 9, and the mixture was stirred for 30 minutes. More acetic acid was added to adjust pH to pH 4–5. The mixture was allowed to stand for 30 minutes at room temperature. The resulting starch was filtered and washed with de-ionized water continuously until the filtrated solution pH is neutral. The obtained starch was dried in air.

The reduced starch was negative for aldehydes by both the dynitrophenylhydrazine test and the Tollen's reagent test, described below at Experiment 7.

Experiment 5—Preparation of Polymer 1 (PVAm)

In general, the PVAm polymer (polymer 1) was made in accord with the following: An aqueous solution of a hydrolyzed homopolymer of N-vinylformamide with a K value of 70 was made. Hydrolysis was carried out with sodium hydroxide. After hydrolysis, the aqueous polymer solution was neutralized to pH 7 with hydrochloric acid. The polymer content of the aqueous solution was 11%. The degree of hydrolysis was 95 mol %, i.e., the polymer contained 95 mol % of vinylamine units and 5 mol % of N-vinylformamide units. The molecular weight of the vinylamine polymer was 200,000. This polymer was designated polymer 1.

The K values were determined according to H. Fikentscher; *Cellulose Chemie*, Vol. 13, p. 58–64 and 71–74 (1932) in a 5% strength, by wt., aqueous NaCl Soln. at 25° C. and at a polymer conc. of 0.5% by wt.

Experiment 6 Preparation of Polymer 2

In some experiments reference is made to "Pol. 2". Polymer 2 is a modified polyethyleneimine. It was produced according to the procedure of Example 3 of U.S. Pat. No. 4,144,123 by condensing adipic acid with diethylenetriamine (6.7 ethyleneimine units per nitrogen group). The grafted product was then cross-linked with a bis-glycidylether of a polyethylene glycol having a molar mass of 2,000. The resulting product (Polymer 2) had a viscosity of 120 mPas (measured in a 10% strength, by wt., aqueous solution at 20° C. and pH 10).

B. Evaluation of Carbonyl and Carboxyl Content in Starch and Oxidized Starch Samples In general, carboxy (—C(O)O—) groups on starch, are capable of ionic interactions with various groups in the polymers, to provide an associate interaction between the starch and the polymer. On the other hand, carbonyl groups, typically aldehyde groups, on the starch, are capable of reaction with certain moities in the polymer (for example primary and secondary amine groups) to form a reactive, covalent, association.

In order to evaluate the effect of having both ionic and covalent actions available for interaction between the starch and polymer, versus only ionic interactions, it was necessary to develop techniques for characterizing oxidized starch with respect to carbonyl content (aldehyde or ketone) and carboxyl content (—C(O)O—). In this section techniques developed and applied with respect to this, are presented.

Experiment 7—Determination of Aldehyde Functional Groups

The analytical methods for the determination of aldehydes can be divided into primary and secondary techniques. In this context, the primary method provides bulk quantitative analytical information without a standard oxidized starch. Secondary methods can give information on the relative levels of aldehydes, and combined with information from a primary method, be calibrated to yield absolute concentrations.

Experiment 7a—Aldehydes by Reaction with Tollen's Reagent (Bulk Analyses)

Tollen's reagent (ammoniacal $Ag_2O$) is known to react with aldehydes, forming elemental silver and carboxylic acid functional groups

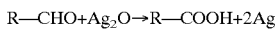

R—CHO+$Ag_2O$→R—COOH+2Ag

If the silver remaining in solution can be determined, the aldehydes can be calculated by difference, making this a potential primary method.

In this experiment, four samples were evaluated. The first, pearl starch, is a non-oxidized starch used as a standard. The second, C1500, is a commercially available product of Cargill, which results from an oxidation of corn starch with sodium hypochlorite, generally in accord with the procedure of Experiment 1, i.e., oxidized with 0.5% available chlorine, by wt. percent on a starch basis. The other two samples evaluated were made using the procedure of Experiment 1, but with 1% available chlorine by wt. percent based on starch, and 2% available chlorine by wt. percent on the basis of starch, respectively.

The results are reported in Table 1. In general, aldehyde levels determined using the Tollen's test will be referred to herein as aldehyde levels determined on a bulk determination basis.

TABLE 1

Bulk Aldehyde levels determined using the Tollen's Test
All values are on a dry starch basis

| | $\mu$eq CHO/g Starch |
|---|---|
| Pearl Starch | <1 |
| C1500 | 36 |
| 1% available chlorine, Oxidized Starch | 64 |

TABLE 1-continued

Bulk Aldehyde levels determined using the Tollen's Test
All values are on a dry starch basis

| | $\mu$eq CHO/g Starch |
|---|---|
| 2% available chlorine, Oxidized Starch | 142 |

Experiment 7b—DNPH (Dinitrophenylhydrazine) Test

Dinitrophenylhydrazine (DNPH) is a yellow compound. When an oxidized starch is treated with a solution of DNPH in glacial acetic acid, the aldehyde groups react with the DNPH, immobilizing it within the granules. After washing, the remaining yellow color is indicative of aldehydes.

The test of oxy-aldehyde with DNPH not only provides information on the aldehyde content, but also provides information for the reactivity between aldehydes on starch and amines analogous to PVAm. Any amine compounds (DNPH) combined with starch through non-covalent bonds are expected to be washed-out completely. Intensities of the yellow color for the starch-DNPH products are ranked with numbers to give relative values.

The DNPH test with a $NaBH_4$ (excess) reduced C1500 and a doubly oxidized starch (sodium chlorite oxidation after the normal sodium hypochlorite oxidation) produced positive results (pale yellow). To confirm these observations, a reduced C1500 was prepared with an excess of $NaBH_4$ as reducing reagent. Freshly prepared reduced-C1500 showed negative to the DNPH test.

DNPH is a nitrogen-containing compound. After reaction of starch with DNPH, non-bound DNPH was washed out and the samples were evaluated for nitrogen (Table 2). The amount of carbonyl groups on the starch was relatively lower than the Tollen's (bulk) test. The reasons could be: a) starch was not swelled and the DNPH could not penetrate into starch, b) Schiffs bond was not stable enough, and hydrolyzed during the washing process. Another complication is that the nitrogen native to the starch is partially removed by washing with acetic acid. It is also noted that the amount of nitrogen removed would be proportional to the degree of oxidation.

TABLE 2

Aldehyde content by nitrogen determination after DNPH treatment

| % Available Chlorine (wt. % based on starch) | $\mu$eq CHO/g | Wt. % CHO |
|---|---|---|
| 0.5% | 0.2 | 0.0006 |
| 1.0% | 2.2 | 0.0063 |
| 2.0% | 11.4 | 0.033 |

Experiment 8—Determination of Carboxylic Acid Functional Groups

An established method for this determination, is based on titration with NaOH, using phenylphthalein as an indicator. Carboxyl groups attached to the starch molecule are leached with hydrochloric acid to convert carboxyl salts to the acid form. Cations and excess acid are removed by washing with water. The washed sample is gelatinized in water and titrated with standard sodium hydroxide solution.

In a potentiometric titration using NaOH as the titrant, the endpoint is the point of maximum rate of change in slope of the curve obtained by plotting pH vs. ml of titrant. If a potentiometric titration curve is plotted as the first derivative, the plot is actually the rate of change in slope vs. ml of titrant. The endpoint is identified by the peak maximum. When very weak acids are titrated, the slope change becomes small, making endpoint determination more difficult.

Conductometric titrations are based on differences in ion mobility in solution. The hydronium ion ($H^+$ or $H_3O^+$) has the highest cationic mobility and the hydroxide ion ($OH^-$) has the highest anionic mobility. If NaOH were titrated into water, the conductivity increases linearly in the concentration range, where the ionic activity coefficient remains reasonably constant. When the solution contains an acid, the conductivity decreases as the highly mobile protons are combined with hydroxide, then increases once the endpoint is passed. The regions before and after the endpoint are extrapolated linearly to determine the intersection point, which is the titration endpoint.

Samples of C1500 (prepared in accord with Ex. 1 with 0.5% available chlorine) using both potentiometric (pH electrode) and conductometric titration. Samples and blanks were tested in triplicate. The results, summarized in Table 3, indicate that the two methods are equivalent within the precision of the measurements.

TABLE 3

Comparison of potentiometric and conductometric titration for carboxyl groups

|  | Conductometric | | Potentiometric | |
| --- | --- | --- | --- | --- |
|  | Blank | C1500 | Blank | C1500 |
| Trial 1 | 0.055 | 0.049 | 0.047 | 0.049 |
| Trial 2 | 0.056 | 0.050 | 0.040 | 0.047 |
| Trial 3 | 0.054 | 0.044 | 0.035 | 0.048 |
| Average | 0.055 | 0.048 | 0.041 | 0.048 |

All values are wt. % on a dry starch basis. Sample values are blank - corrected.

C. Effect of Aldehydic Groups in Oxidized Starch

As previously discussed, carboxyl groups in starch are not capable of covalent interaction with the amine groups in the polymer, but rather are only available for ionic interaction to form the starch/polymer adduct. Carbonyl groups on the other hand, for example aldehyde groups, are available for reactive interaction with the polymer, in particular with the primary amine and/or secondary amine groups in the polymer. In this section, experiments are reported which indicate the potential significance of the availability of both ionic and covalent interactions, in the starch/polymer composition with respect to incorporation of the resulting starch/polymer composition, into paper, for beneficial results.

Experiment 9—Effect of Aldehyde Presence in Oxidized Starch on Performance of Starch/Polymer Combination in Paper Hypochlorite oxidized starch (oxidized 0.5% available chlorine by wt. of starch) made in accord with Experiment 1 and reduced hypochlorite oxidized starch made in accord with Experiment 4 were slurried in water. Pol. 1 was added at 1.5% on starch basis. The slurry was mixed for 10 minutes. The samples were cooked in a pilot jet cooker at 290° F. with a five minute residence time. The viscosity of the oxidized sample was 1560 cps, the reduced oxidized 22 cps (measured at 4.5 wt. % solids). Paper was made for evaluation. The starch dosage in paper was 2%. The paper grammage was 100 g/m².

TABLE 4

| Modification | Pol. 1 (%) | Pol. 2 (%) | Burst index kPa m²/g | Tear index mN m²/g | Tensile Index N-M/g |
| --- | --- | --- | --- | --- | --- |
| control (no added starch) |  |  | 1.3 | 9.5 | 24 |
| oxidation with 0.5% available chlorine | 1.5 | 0 | 1.9 | 11.4 | 30 |
| reduced with excess NaBH₄ after oxidation with 0.5% active chlorine | 1.5 | 0 | 1.6 | 9.8 | 27 |

It is noted that the oxidized starch utilized for the experiments reported in Table 4, was starch that had been oxidized with hypochlorite solution. As indicated above in Experiments 7 and 8, starch oxidized with hypochlorite solution (C1500) has both detectable levels of aldehyde groups (CHO) and carboxyl groups (—C(O)O— groups).

As shown in Table 4, the oxidized starch showed a burst index increase for the paper, over a control in which there was no added starch, of 0.6 kPa m²/g, or 46%.

As discussed above in connection with Example 4, reduction with excess NaBH₄, of starch which has been oxidized with sodium chlorite, does not reduce the carboxyl groups, but only reduces the aldehyde groups. Thus, in Table 4, the reported results for the starch which had been reduced after previous oxidation with sodium hypochlorite, indicates the effectiveness of the starch as an additive when only the carboxyl groups in the starch were present. In this instance, the burst index was increased, relative to the control, by only 0.3 kPa m²/g, or only 23%. From the comparative results, then, it is apparent that the presence of the aldehyde groups in the oxidized starch provide significant added benefit, with respect to the ultimate result observed in the paper, after reaction with the polymer. Since the aldehyde groups are not capable of ionic interaction, the comparative results indicate that the potential reactivity presented by the aldehyde groups in the starch, with the primary and secondary amine groups in the polymer, provides benefit with respect to formation of the starch/polymer combination, and use of that starch/polymer combination as a paper additive.

D. Examples of Preparation of Starch/Polymer Combinations

In Experiment 9 above, a starch/polymer combination was prepared by mixing a slurry of the oxidized starch with a slurry of the polymer, with follow-up jet cooking. In this section, experiments are reported indicating a variety of manners in which the oxidized starch and the polymers can be combined for use.

In these experiments, reference is sometimes made to "one component" and/or "two component" systems. Experiments are meant to model commercial activity, utilizing starch/polymer combinations. In general, the reference to one component or two component systems, refers to how the product would be shipped to the papermaking facility. A one component system, would be a system in which a single pre-mixed or pre-reacted combination of starch and polymer is shipped to a papermaking facility. For a two component system, the papermaking facility would receive the oxidized starch component and the polymer component separately, and the two would be combined in processing equipment at the papermaking facility.

Experiment 10—Semi-dry/Wet Procedure for Preparing an Adducted Combination (One Component)

After oxidation of starch with hypochlorite in accord with Experiment 1 (0.5% available chlorine on starch basis) the starch slurry was dewatered in a decanter. The filter cake (50% by wt.) was mixed with an aqueous solution of polymer 1 using 2% by wt. of polymer 1 (calculated as 100% polymer) with reference to oxidized starch, in a plough blade mixer for 5 minutes. Subsequently the mixture was dried in a ring dryer. The inlet temperature was 110° C. and the outlet temperature was 60° C. The outlet moisture content was 12%.

Before application in paper, the combination was slurried in a mixing tank at a concentration of 10%. After one minute of mixing, the slurries were cooked and allowed to react in a laboratory cooker at 130° C. for 1 minute. After cooking and reacting a polymer modified starch dispersion resulted. The dispersion was diluted to obtain a final DS concentration of 2% by wt.

Experiment 11 Dry/wet Procedure for Preparing an Adducted Combination (One Component)

After oxidation of starch with hypochlorite (0.5% available chlorine on starch basis), the starch slurry was dewatered in a ring drier (resulting moisture content was 12%). The dry starch was mixed with an aqueous solution of polymer 1 using 2% of polymer 1 (calculated as 100% polymer) with reference to oxidized starch, in a plough blade mixer for 5 minutes. Subsequently the mixture was dried in a ring dryer at an inlet temperature of 110° C. The outlet temperature of the dryer was 60° C. The final moisture content was 12%.

Before application in paper the sample was slurried in a mixing tank at a concentration of 10%. After one minute mixing the slurries were cooked and allowed to react in a laboratory cooker at 130° C. for 1 minute.

After cooking and reacting, a polymer modified starch dispersion resulted. The dispersion was diluted to obtain a final DS concentration of 2% by wt.

Experiment 12—A Laboratory Model of Two Component System

After oxidation of starch with hypochlorite in accord with Experiment 1 (0.5% available chlorine on starch basis) the starch was dewatered with a rotary vacuum filter and dried in a ring dryer. To a 10% slurry of this starch was added an aqueous solution of polymer 1 using 2% of polymer 1 (calculated as 100% polymer) with reference to oxidized starch. After one minute the slurry was cooked and allowed to react in a laboratory cooker at 130° C. for 1 minute. After cooking and reacting polymer modified starch dispersion resulted. The dispersion was diluted to obtain a final DS concentration of 2% by weight.

Experiment 13—Preparation of a One Component System Including Gelled Starch

After oxidation of starch with hypochlorite in accord with Experiment 1 (0.5% available chlorine on starch basis), the starch was dewatered in a peeler centrifuge up to a final dry solids content of 50%. The starch was then dried in a ring dryer. A slurry of the oxidized starch and polyvinylamine in water (using 1.5% of polymer 1—calculated as 100% polymer with reference to oxidized starch) was cooked in a high shear continuous reactor (a jet cooker equipped with a rotating tooth and chamber set after the steam injection) at 145° C., 2% concentration, residence time of 13 minutes at 6000 rpm. The resulting polymer modified starch dispersion was dried in a pilot plant spray dryer at a feed flow of 100 l/h. The dispersion was sprayed via an atomizer operating at 180 Hz. The inlet temperature was 215° C. and the outlet temperature 75° C. The end product had a moisture content of 10%.

The polymer modified starch was dispersed in water of 60° C. until a concentration of 2% w/w was reached while mixing it for 1 minutes. A polymer modified starch dispersion resulted.

E. Hand Sheet Procedures; Performance in Paper

In Experiment 9 reported above, the effect of various starch/polymer combinations on the performance of paper, was reported.

The paper performance of other starch/polymer combinations was tested by measuring one or more of the following strength or stiffness values: burst strength; SCT (short span compression test); CMT (corona median test); tensile strength or tear strength. Strength or stiffness increases are expressed as absolute values or as percent increase compared to a blank sample that was prepared without the addition of the polymer modified starch.

The amount of starch retained in the paper was measured by enzymatic hydrolysis of the paper sheets, followed by HPOC determination of glucose. Starch retained in paper (starch retention) was calculated as percent of total starch added after correction for the starch present in the blank sample (recycled paper).

Experiment 14: Selected Hand Sheet Analyses; No Retention Aid; Hand Sheets with Polymer Modified Starch from Experiments 10–12

A paper stock suspension of 100% waste paper having a consistency of 0.75% was used. The paper sheets were made in the laboratory in a standardized fashion (Tappi T 205 sp-95). The sheets were made with an automated sheet former (Rapid-Köthen BMC-3). The dry solid concentration of the used pulp suspension was between 0.7–0.9%. An amount of polymer modified starch dispersion was then added corresponding to 4% dry starch on dry pulp.

The weight of the paper sheets was 120 gr/m$^2$. No retention aid was added. After conditioning (ISO 11093-2) the paper at 23° C. and 50% RH the paper performance was tested by measuring the Burst strength and SCT (short span compression). The amount of starch retained in the paper was measured by enzymatic and acid hydrolysis of the paper sheets, followed by HPLC. Starch retention was calculated as % of total starch added. The results are in Table 5. Viscosities of the cooked compositions were measured at 2% conc., at 40° C.

TABLE 5

| Polymer Modified Starch from Experiment # | Viscosity After Cooking (mPas) | Burst Strength Increase (%) |
| --- | --- | --- |
| 10 | 67 | 32 |
| 11 | 50 | 32 |
| 12 | 65 | 36 |

The burst strength is calculated as an increase over a blank sample (without starch addition—burst strength of the blank sample was 232 kPa).

Discussion: Variations in the manufacturing procedure of the polymer modified starch had no significant effect on the burst strength increase.

Experiment 15—Further Hand Sheet Analyses; Comparatives

A paper stock suspension of 100% wastepaper having a consistency of 0.75% was used. For Experiments 15–15e, the paper sheets were made in the laboratory in a standardized fashion (Tappi T 205 sp-95). The sheets are made with an automated sheet former (Rapid-Köthen BMC-3). The dry solid concentration of the used pulp suspension was between 0.7–0.9% (recycled fiber was used). An amount of starch polymer dispersion was then added corresponding to 4% dry starch on dry pulp.

Polymer 2 was added as a retention aid at a concentration of 0.06% polymer 2 on dry pulp. The weight of the paper sheets was 120 gr/m².

After conditioning (ISO 11093-2) the paper at 23° C. and 50% RH the paper performance was tested by measuring the Burst strength.

Unless otherwise stated, the examples were compared to a blank sample with a burst strength of 255 kPa and an SCT 2.11 kN/m.

Experiment 15a—An Example of a Very Low Level of Oxidation

A 10% slurry of periodate oxidized corn starch (0.01 w % periodate on starch basis) made in accord with procedure of Experiment 2 was made and cooked in a jet cooker with an aqueous solution of polymer 1 using 1.5% of polymer 1, calculated as 100% active compound, with reference to oxidized starch. The cooking temperature was 130° C., residence time 1 minute. The resulting dispersion was diluted to a final concentration of 2%.

TABLE 6

| Exp. | Starch Modification | Pol. 1 (%) | Pol. 2[1] (%) | Burst increase (%) | Retention |
|---|---|---|---|---|---|
| 15a | 0.01% periodate | 1.5 | 0 | 40 | 60 |

[1]Not including the retention aid level of 0.06%.

A relatively high burst increase was obtained; Retention, however, was relatively low.

Experiments 15b, 15c—Use of a Periodate Oxidized Starch with an Alternative Polymer to PVAm In Experiments 15b and 15c, an alternative polymer to PVAm is reacted with the oxidized starch. In particular the polymer used, referred to as polymer 2, is a modified polyethyleneamine, see Experiment 6.

For Experiments 15a, 15b, 5% slurry of periodate oxidized corn starch (0.5 w % periodate on starch basis made in accord with procedure of Experiment 2) was made and cooked in a jet cooker with an aqueous soln. of polymer 2 using 0.6 wt. % of polymer 2 (Exp. 13) and 3 wt. % of polymer 2 (Exp. 14), calculated as 100% polymer, with reference to oxidized starch. The cooking temperature was 130° C., residence time 2.8 minute. The resulting dispersion was diluted to a final concentration of 2%. The average volume weighted mean diameter of the particles was 0.6 μm (B) and 0.19 μm (C) respectively as measured by Malvern 2000 particle sizer (Mie calculations).

TABLE 7

| Experiment | Starch Modification | Pol. 1 (%) | Pol. 2 (%) | Burst Increase (%) | SCT Increase (%) | Retention |
|---|---|---|---|---|---|---|
| 15b | 0.5% periodate | 0 | .6% | 15 | 20 | 8 |
| 15c | 0.5% periodate | 0 | 3% | 41 | 33 | 28 |

The starch retentions were very low, caused by the very small particle size of the cooked dispersions. Starch retention increase, with increasing amounts of polymer 2. Although starch retention is relatively low, the strength of the increase was significant.

Experiments 15d, 15e—Variation in Amount of PVAm

In Experiments 15c and 15d, comparatives were done to vary the amount of PVAm present for interaction with the oxidized starch, with a fixed amount of oxidation level.

For Experiments 15c, 15d, a 2% slurry of periodate oxidized corn starch (0.5 w % periodate on starch basis made in accord with procedure of Experiment 2) was made and cooked in a jet cooker with an aqueous solution of polymer 1 using 0.3 wt. % of polymer 1 and 1.5 wt. % of polymer 1 (calculated as 100% polymer) with reference to oxidized starch. The cooking temperature was 145° C., residence time 2.8 minute and dilution to 2%. The average volume weighted mean diameter of the particles was 0.65 μm. (Malvern procedure).

TABLE 8

| Exp. | Sample | Pol. 1 (%) | Pol. 2 (%) | Burst Increase (%) | SCT Increase (%) | Retention (%) |
|---|---|---|---|---|---|---|
| 15d | 0.5% periodate | 0.3 | 0 | 8 | 13 | 5 |
| 15e | 0.5% periodate | 1.5 | 0 | 28 | 28 | 18 |

The starch retentions were very low, caused by the very small particle size of the cooked dispersions. Starch retention increased with increasing amounts of polymer 1. Although the starch retention was low, the strength increase was significant.

Experiment 16—A Comparative Starch that has Only Carboxyl Moieties for Ionic Interaction with Polymer In this experiment, a starch was modified to only have carboxyl groups, by a carboxyalkation. The level of provision of carboxyl groups in a starch was calculated to be approximately the same as the level of carboxyl groups present in C1500, i.e., starch modified in accord with the procedure of Experiment 1. That is, as indicated above in starch modified in accord with Experiment 1 has both carboxyl moities and aldehyde moities present. Experiment 16 provides for a starch which has a carboxyl level similar to that provided in starch in accord with Experiment 1, but without an aldehyde level. This is accomplished by providing a carboxylalkation, which is not an oxidation and therefore does not oxidatively introduce aldehyde or ketone groups (i.e., carbonyl moities) into the starch.

A 10% slurry of carboxymethylated corn starch (made in accord with Experiment 3) was made and cooked in a jet cooker with an aqueous solution of polymer 1 using 1.5 wt. % of polymer 1 (calculated as 100% polymer) with reference to the carboxymethylated starch. The cooking temperature was 130° C., residence time 1 minute and dilution to 2%.

TABLE 9

| Experiment | Starch Modification | Pol. 1 (%) | Pol. 2 (%) | Burst Increase (%) |
|---|---|---|---|---|
| 16 | 0.3% chloroacetic acid | 1.5 | 0 | 12 |

The above result can be compared with the result in Table 4, for starch oxidized with 0.5% available chlorine. That starch showed a burst index increase, over a control, of 46%. By comparison, the increase for Experiment 16 was only 12%, indicating there was a significant additional effect obtained when the aldehyde groups were present in addition to the carboxyl groups, for interaction with the polymer.

Experiment 17—Use of a Pregelled Starch

In this experiment, the polymer made in accord with Experiment 13 was used, to demonstrate that efficacy could be obtained in spite of the fact that the material had been pregelled.

A pregelled hypochlorite oxidized starch (made in accord with Experiment 13) was dispersed in water of 60° C. until a concentration of 2 wt. % dry solids was reached while mixing it for 1 minutes. The average volume weighted mean diameter of the particles was 1.85 μm.

TABLE 10

| Exp. | Starch Modification | Pol. 1 (%) | Pol. 2 (%) | Burst Increase (%) | SCT Increase (%) | Retention (%) |
|---|---|---|---|---|---|---|
| 17 | Pregelled, available chlorine, 0.5% | 1.5* | 0 | 43 | 35 | 60 |

*was already present in the pregelled material according to Exp. 13.

A relatively high burst and high SET increase was obtained. Retention was, however, relatively low; the low retention being attributable to a relatively small mean particle size.

Experiment 18—An Example of a Hypochlorite Oxidized Starch, with a Polymer Other than PVAm A 5% slurry of oxidized starch made in accord with the procedure of Experiment 1 with 0.5 wt. % available chlorine on starch basis with 0.6 wt. % Pol. 2, on starch basis, was cooked in a jet cooker at 145° C. with a residence time of 2.8 and diluted to 2%. The average volume weighted mean diameter of the particles was 0.25 μm.

TABLE 11

| Exp. | Modification | Pol. 1 (%) | Pol. 2 (%) | Burst Increase (%) | SCT Increase (%) | Retention (%) |
|---|---|---|---|---|---|---|
| 18 | 0.5% available chlorine | 0 | 0.6 | 30 | 17 | 20 |

There was relatively low starch retention. It is noted the burst increase was relatively good.

Experiment 19—Variation in Oxidation Level of Starch

In Experiment 19, the level of oxidation of the starch (based on percent available chlorine in hypochlorite oxidized starch process) was explored, with respect to burst strength and retention. In general, it was observed that burst strength increase went through a maxima, as a function of oxidation level, and then began to decrease with greater oxidation level.

The method of oxidation of the corn starch was in accord with Experiment 1, except varied for the amount or percent available chlorine, as indicated in the table. It is noted that the experiment was conducted comparing the variations and results from different oxidation levels at a concentration of polymer 1 (PVAm) level of 1% and also at 2%. In both instances, maxima were observed.

More specifically, type 1 paper was manufactured using a paper additive, which included a corn starch that had been manufactured according to Experiment 1 with the exception that the available chlorine was about 0.1% available chlorine by weight of starch. Type 2 paper was manufactured using the paper additive similar to type 1, with the exception that the available chlorine concentration during the manufacture of the starch was about 1% available chlorine by weight of starch. Type 3 paper was manufactured using the paper additive similar to type 1, with the exception that the available chlorine concentration during the manufacture of the starch was about 1.25%. Type 1, 2 and 3 papers were manufactured using a paper additive including 1% of polymer 1 (calculated as 100% polymer) with reference to the starch.

Type 4, 5 and 6 papers were manufactured according to Type 1, 2 and 3 respectively. However, instead of the paper additive comprising about 1% polymer 1, the types 4, 5 and 6 paper were manufactured using a paper additive comprising 2% polymer 1 with reference to the starch.

Before application in paper the starch sample was slurried in a mixing tank at a concentration of 10% and the PVAm solution was added. After one minute of mixing, the slurries were cooked and allowed to react in a laboratory cooker at 130° C. for 1 minute. Starch dosage on paper was 2%.

TABLE 12

Tensile burst strength (TBD) of paper manufactured using paper additives that are applied in the wet-end of the paper manufacturing process. Paper additives were manufactured with starches treated at varying concentrations of available chlorine and polymer 1 with reference to the starch.

| Paper Additive | Concentration available chlorine (% available chlorine by weight of starch) | Pol. 1 (wt. %) | Burst Strength (μPa) | Starch in Paper (mg/g) |
|---|---|---|---|---|
| Control | — | 0 | 199 | 18.2 |
| Type 1 | 0.5% | 1 | 236 | 26.8 |
| Type 2 | 1% | 1 | 246 | 29.9 |
| Type 3 | 1.25 | 1 | 213 | 23.1 |

For 1 wt. % polymer 1 on starch, the best burst strength increase was obtained using starch oxidized at a level of 1% available chlorine.

TABLE 13

Burst strength of paper manufactured using paper additives that are applied in the wet-end of the paper manufacturing process. Paper additives were manufactured with starches treated at varying concentrations of available chlorine and 2% polymer 1 with reference to the starch.

| Paper Additive | Concentration available chlorine (% available chlorine by weight of starch) | Pol. 1 (wt. %) | Burst Strength (kPa) | Starch in Paper (mg/g) |
|---|---|---|---|---|
| Control | — | 0 | 199 | 18.2 |
| Type 4 | 0.5% | 2 | 255 | 32.8 |
| Type 5 | 1 | 2 | 268 | 33.5 |
| Type 6 | 1.25 | 2 | 245 | 26.2 |

Again, the best burst strength increase was at a 1% oxidation level.

Experiment 20—Variations in Tensile Strength Based on Variations in Oxidation Level In this experiment, tensile strength was measured as a variation of level of oxidation of the starch, at two different polymer 1 levels, i.e., 1.5% and 2%. In both instances maxima were observed, with increasing percent oxidation, after which a reduction in strength occurred.

More specifically, the paper types 7, 8 and 9 were manufactured according to Types 1, 2 and 3 respectively (characterized in Experiment 19), however, instead of the paper additive comprising about 1% polymer 1 the types 7, 8 and 9 comprised about 1.5% polymer 1. Table 14 shows the results.

TABLE 14

Tensile strength of paper manufactured using paper additives that are applied in the wet-end of the paper manufacturing process. Paper additives were manufactured with starches treated at varying concentrations of available chlorine and 1.5 wt. % polymer 1 with reference to starch.

| Paper Additive | Concentration available chlorine (% available chlorine by weight of starch) | Tensile strength (m) | Increase of tensile strength compared to zero (%) |
|---|---|---|---|
| Control | — | 3858 | 0 |
| Type 7 | 0.5% | 4330 | 12 |
| Type 8 | 1 | 4347 | 13 |
| Type 9 | 1.25 | 4254 | 10 |

As indicated, an analogous study was done except for the use of 2 wt. % polymer 1 with reference to the starch. Table 15 shows the results.

TABLE 15

Tensile strength of paper manufactured using paper additives that are applied in the wet-end of the paper manufacturing process. Paper additives were manufactured with starches treated at varying concentrations of available chlorine and 2 wt. % polymer 1 with reference to the starch.

| Paper Additive | Concentration Available Chlorine (% available chlorine by weight of starch) | Tensile Strength (m) | Increase of Tensile Strength Compared to Control (%) |
|---|---|---|---|
| Control | (no starch) | 3858 | 0 |
| Type 10 | 0.5 | 4239 | 10 |
| Type 11 | 1 | 4487 | 16 |
| Type 12 | 1.25 | 4248 | 10 |

Experiment 21—Starch Retention as a Function of Level of Starch Oxidation

In Experiment 21, starch retention is as a function of variation oxidant level is provided. Comparatives were made at 0.5% and 5% available chlorine by wt. of starch, in the oxidation. Additionally, starch retention is a variation of Polymer A concentration in the reaction when the starch was evaluated.

In general, it was observed that starch retention was higher, at a lower level of oxidation (oxidation with 0.5% available chlorine, as opposed to oxidation with 5% available chlorine). It was also observed that an increase in the amount of Polymer A present did not affect starch retention.

The specific contents utilized, are reported in Table 16 below. The starch was made in accord with Experiment 1, except as indicated. The amount of Polymer A is reported in Table 16 as well. Polymer A is defined after the table.

TABLE 16

| Paper Additive | Concentration Available Chlorine (% available chlorine by weight of starch) | Poly. A (% W/V) | CMT (N) | Starch Retention (%) | Starch in Paper (mg/g) |
|---|---|---|---|---|---|
| Control | (no starch) | 0 | 130 | — | — |
| Type 13 | 0 | 15 | 171 | 28 | 5.6 |
| Type 14 | 0.5 | 15 | 182 | 78 | 15.6 |
| Type 15 | 5 | 15 | 165 | 24 | 4.8 |
| Type 16 | 5 | 30 | 180 | 24 | 4.8 |

"Poly. A or Polymer A" is a hydrolyzed polyvinylformamide with a degree of hydrolysis of 96%, i.e. a polyvinylamine consisting of 96% by mole of vinylamine units and 4% by mole of vinylformamide units. The molecular weight (Mw) was 400,000. It was a 12% strength by wt. aqueous polymer solution having a pH of 7.5.
"CMT" refers to the Corona Medium Test and was measured according to the German Standard Specification DIN EN 23035 (corresponding ISO 3035).

Experiment 22—Variations in Particle Size Distribution

Cooking conditions affect particle size distribution in the resulting starch/polymer combination. In this experiment, effective variation in particle size, in burst increase and retention, were made. The comparative to a paper composition containing no added starch.

A 5% slurry of adduct made in accord with Experiment 9 (0.5% available chlorine; 1.5% PVAm, polymer 1) was made and cooked in a continuous high shear mixer. The cooking conditions were varied.

Sample A was cooked at 130° C., residence time of 1 minute at 2% concentration of 3000 rpm. The resulting dispersion had a volume weighted mean particle size of 10 µm (measured by Malvern).

Sample B was cooked at 145° C., residence time of 6 minutes at 2% concentration at 3000 rpm. The resulting dispersion has a volume weighted mean particle size of 1 µm (measured by Malvern).

The starch dosage in the paper was 4%.

TABLE 17

Burst Increases and Retention for Samples A and B

| Sample | Burst Increase (%) | Retention (%) |
|---|---|---|
| A | 27 | 88 |
| B | 62 | 46 |

The blank sample showed: burst 255 kPa and SCT 2.11 kN/m

This example shows the effect of cooking additions and the resulting particle size distribution on the performance of the polymer modified starch and paper. Sample A, characterized by a mean particle size of 10 microns, showed the highest retention, and the lowest burst increase. Sample B, characterized by a mean particle size of 1 micron, showed the lowest retention and the highest burst increase.

Experiment 23—Variations in Paper Characteristics Based on Percent Addition of Starch/Polymer Combination In Experiment 23, variations in certain paper characteristics, based upon variations in dosage level of the starch/polymer combinations are evaluated. In the context of this experiment, the term "starch dosage" is meant to refer to the starch/polymer composition.

A 5% slurry of adduct made in accord with Experiment 5 (hypochlorite oxidized starch with 0.5% available chlorine +1.5% PVAm) was prepared and cooked in a high shear mixer. The cooking temperature was 145° C., residence time 6 minutes, the amount of shear 3000 rpm. The resulting dispersion was diluted to a final concentration of 2%. The amount of starch dosed in paper was varied: 2, 4 and 6%. Analysis is reported in Table 18.

TABLE 18

| Starch Dosage | Burst Increase (%) | SCT Increase (%) | Retention (%) |
|---|---|---|---|
| 2% | 13 | 10 | 80 |
| 4% | 16 | 21 | 85 |
| 6% | 35 | 24 | 82 |

The blank sample showed: burst 255 kPa and SCT 2.11 kN/m.

This experiment shows that a starch dosage of 6% is possible without loss of starch retention. The burst strength and SCT both increased, with increasing amounts of starch.

Experiment 24—Formation of Starch/Polymer Combination without Isolation of Oxidized Starch In Experiment 24, evaluation of formation of starch/polymer combinations without isolation of the oxidized starch was conducted. In general, the formation involved adding the PVAm polymer 1) solution to the starch slurry including the oxidant, prior to isolation of the oxidized starch from the slurry. Seven samples, 24a–24g, were prepared, with variations as follows.

Sample 24a

A 10% aqueous slurry of corn starch was oxidized with 0.01% of sodium periodate at a temperature of 20° C. at pH 6 (in accord with Experiment 1) to form lightly oxidized starch having a calculated dialdehyde content of 0.00013 per unit of glucose. This slurry was mixed with an aqueous solution of polymer 1 using 1.8% of polymer 1 (calculated as 100% polymer) with reference to oxidized starch. 20, liters/hr of the aqueous mixture thus obtained were continuously pumped through a laboratory digester and heated therein at a temperature of 130° C. and a pressure of 3.5 bar for an average residence time of 1 minute.

The reaction mixture was continuously let down and continuously diluted with 80 l/h of water having a temperature of 20° C. A 2% strength aqueous solution of polymer modified starch was obtained which had a mass median particle diameter of 33 µm. The viscosity of this aqueous solution was 31 mPas.

Sample 24b

The process for Sample 24a was repeated, except that the concentration of the slurry of the oxidized starch was 5% and the amount of the mixture of oxidized starch and polymer 1 fed through the digester was 10 l/h. The average residence time of the mixture was then continuously let down and continuously diluted with 40 l/h of water, forming a 1% strength aqueous solution of polymer modified starch having a mass median particle diameter of 5 µm. The viscosity of the 15% strength aqueous solution was 16 mPas.

Sample 24c

The process for Sample 24a was repeated, except that the average residence time of the aqueous mixture of oxidized starch and polymer 1 in the heating zone of the digester was 30 seconds. The viscosity of the aqueous 2% strength solution of polymer modified starch was 110 mPas. The polymer modified starch had a mass median particle diameter of 68 µm.

Sample 24d

The process for Sample 24a was repeated, except that the oxidized starch was digested in the absence of polymer 1 at a temperature of 120° C. The 2% strength starch solution had a viscosity of 850 mPas. The mass median particle diameter of the digested oxidized starch was 260 µm.

Sample 24e

The process for Sample 24a was repeated with the only exception that corn starch was oxidized with 0.1% of sodium periodate with reference to starch. The calculated dialdehyde content of the oxidized starch was 0.0013 per glucose unit. The reaction product was in the form of a gel with a high viscosity and could not be further processed.

Sample 24f

The process for Sample 24a was repeated with the only exception that corn starch was oxidized with 0.05% of sodium periodate with reference to starch. The calculated dialdehyde content of the oxidized starch was 0.0065 per glucose unit. The reaction product was in the form of a gel which could not be further processed.

Sample 24g

The process for Sample 24a was repeated with the only exception that the oxidized starch was replaced by the same amount of natural corn starch. The viscosity of the 2% strength digested reaction mixture was 15 mPas. The polymer modified starch had a mass median particle diameter of 0.2 µm.

Experiment 25—Use of Samples 24a–24g in Paper

A paper stock suspension consisting of 100% wastepaper having a consistency of 0.75% was used. In each of these Examples 4% of the reaction products 24a–24g were added to the above paper stock suspension. After addition of the polymer modified starch, sheets were formed from the paper stock suspension on a Rapid-Kötchen sheet former. The basis weight of the sheets was 120 g/m. The dry burst pressure and the CMT value of the sheets formed were determined as described above. The results obtained are given in Table 19.

TABLE 19

| Experiment No. | Addition of Polymer Modified Starch Obtained in Example | Burst Strength (EPa) | CMT (N) |
|---|---|---|---|
| 25a | 24a | 338 | 205 |
| 25b | 24b | 345 | 209 |
| 25c | 24c | 276 | 174 |
| 25d | 24d | 252 | 159 |
| 25e | 24e | could not be processed | |
| 25f | 24f | could not be processed | |
| 25g | 24g | 254 | 161 |
| 25h | Comparative; starch was not oxidized Dewatering of the paper stock without any further auxiliary | 240 | 155 |

Experiments 25a–25c show the effect of variation of cooking of he starch/polymer on the performance in paper. A longer residence time in the cooker (Experiments 25b and 25c) give a higher bursting strength increase. Experiment 25b is cooked at a lower concentration, which also results in the higher strength increase compared to Experiment 25a.

Experiment 25d shows that without the addition of polymer 1, the strength increase is considerably lower. Experiment 25h shows a relatively low strength increase, when starch is not oxidized.

Experiments 25e and 25f show that oxidation of starch with 0.01 and 0.05% by weight of sodium periodate with reference to starch resulted in a gelled polymer modified starch which could not be further processed at least under the mild cooking conditions used.

Experiment 26—A Chemical Imaging Study

The C1500 oxidized starch product has also been analyzed using chemical imaging technology. These studies have shown that the aldehyde groups that are introduced as a result of the oxidation reaction increase in amount as the oxidation levels increase. It has also been shown that the aldehyde formation is not uniform, with very distinct heterogeneity within and between starch granules.

C1500 Product

The C1500 product is an oxidized starch, oxidized by 0.5% available chlorine (with NaCCl). It is the base material that forms the substrate for the adducted combination.

C1500 Morphology

The C1500 starch granule contains holes and fissures large enough for chemical components to enter into the inside of a granule. Indeed, chemical fluorescence markers were found in the "star chamber" that exists at the center of many granules.

Aldehyde-Specific Molecular Marker

In order to determine the distribution of aldehyde on the surface of an individual granule of starch, an aldehyde specific marker was chosen. Molecular markers work by having two molecular functionalities attached to one molecule; one functionality binds to the species of interest, while the other functionality provides an analytical "handle" to make measurement possible. In this case fluorescein-5-thiosemicarbazide was used. This marker will bind to aldehydic carbonyls selectively, while providing a strong fluorescence signal.

CLSM Chemical Imaging

Confocal laser scanning microscopy (CLSM) is a chemical imaging technique that uses laser illumination and fluorescence detection. Confocal imaging allows the acquisition of single focal planes of light in slices of limited and pre-determined thickness. This technique posses the ability to optically "slice" through a material, thus giving CLSM the unique ability to image interior sections of material. When used in the fluorescence mode, the CLSM can be used to image the starch granules that have been reacted with the molecular marker.

The fluorescein-5-thiosemicarbazide molecular marker was prepared per vendors' instructions. A series of starch samples were reacted with the molecular marker. A pearl starch (0% available Cl) was used as a baseline for the method. Samples of starch oxidized with 0.5% available Cl, 1.0% available Cl, and 2.0% available Cl were prepared. After reaction with the fluorescein-5-thiosemicarbazide, each sample was imaged using the CLSM.

It was readily apparent from the images that the fluorescence from the molecular marker was increasing with the increasing level of oxidation. It was also apparent that there is a heterogeneity that exists in the reaction with the marker. This was direct evidence of heterogeneity in carbonyl distribution in oxidized starches. By using image analysis techniques, one can quantitate the average marker intensity as well as the deviation in intensity.

The intensity and variability in each starch granule can be measured by defining an area and asking the computer algorithm to provide average intensity and deviation of intensity. A total of 71 particles from each sample were analyzed in this fashion.

An increase in the average intensity with increasing oxidation was noted. It was also noted that the C1500 production sample had a very similar intensity to the 0.5% laboratory generated sample. This was considered compelling evidence that the aldehyde groups increase with increasing available chlorine.

A plot of the average standard deviation of the carbonyl distribution in a single granule of starch was made. The value was directly proportional to the heterogeneity of the aldehyde distribution on a single granule.

There was observed a heterogeneity of aldehyde formation in the starch granule, the higher the number, the more heterogeneity.

Interior Chemical Contrast

One feature of CLSM imaging is the ability to optically slice in the Z direction through a sample and image the interior without having to physically slice into the material.

Since the C1500 starch does not produce an image in the fluorescence mode of the microscope, any image returned will be from the molecular marker. An image intensity was noted in the center of the granule, confirming that there was oxidation occurring on the inside of the granule.

Raman Chemical Imaging

Raman chemical imaging is a relatively new technique. Using a high quality microscope, coupled with a high-resolution diode array, high-resolution molecular images can be produced. These high-resolution imaging systems are very powerful in their ability to produce images that clearly delineate molecular contrasts without the need for prior chemical modification.

A C1500 sample was subjected to Bright field and to Raman chemical imaging with the objective to directly view evidence of heterogeneity of carbonyl distribution. Contrasts that show on the Raman image are generated not by morphology differences, but by the differences in the carbonyl band intensity.

The data showed a very similar portion to the data generated by the molecular marker technique. Rather than being evenly distributed, or randomly placed in the granule, the intensity followed distinct bands.

CONCLUSIONS FROM IMAGING STUDY

From the imaging data collected several conclusions were drawn:

- Aldehyde-specific molecular markers can be used on C1500 to detect carbonyls
- The amount of aldehyde detected on individual granules increases as the percentage available chlorine on the oxidation reaction increases
- By CLSM chemical imaging it was determined that aldehyde heterogeneity exists on individual starch granules
- Also heterogeneity exists between individual granules in a C1500 sample
- The absolute value of the variability in the aldehyde content of a single granule also goes up as the percentage available chlorine on the oxidation reaction increases
- As a relative percentage of total aldehyde content, the heterogeneity between levels of oxidation, though, is fairly constant
- CLSM chemical imaging shows that the oxidation reaction occurs on the surface and in the interior of the starch granule
- Raman chemical imaging directly corroborated the molecular marker data showing carbonyl band concentration zones on an individual C1500 particle

What is claimed is:

1. A composition comprising an adducted combination formed by reacting
   (a) a starch component having a polymer reactive carbonyl functionality of at least 5 microequivalents per gram and comprising a starch oxidized with oxidizing agent selected from periodate(s); hypochlorite(s); ozone; peroxide(s); hydroperoxide(s); hydrogen peroxide; persulfate(s); percarbonate(s); and, mixtures thereof; and
   (b) a polymer component having carbonyl reactive functionality.

2. A composition according to claim 1 wherein:
   (a) the starch component comprises a starch oxidized with oxidizing agent selected from sodium periodate; potassium periodate; sodium hypochlorite; calcium hypochlorite and mixtures thereof.

3. A composition according to claim 2 wherein:
   (a) the starch component comprises oxidized starch resulting from oxidizing with 0.01% to 5% oxidizing agent, by wt. of starch.

4. A composition according to claim 3 wherein:
   (a) the starch component comprises oxidized starch resulting from oxidizing with 0.3% to 3.0% oxidizing agent, by wt. of starch.

5. A composition according to claim 4 wherein:
   (a) the oxidizing agent is periodate oxidizing agent.

6. A composition according to claim 2 wherein:
   (a) the starch component comprises starch oxidized with hypochlorite oxidizing agent.

7. A composition according to claim 6 wherein:
   (a) the starch component comprises a starch oxidized with hypochlorite oxidizing agent at a level of 0.005% to 3.0% available chlorine, by wt., based on wt. of starch.

8. A composition according to claim 7 wherein:
   (a) the starch component comprises a starch oxidized with hypochlorite oxidizing agent at a level of 0.15 to 1.5% available chlorine, by wt., based on wt. of starch.

* * * * *

UNITED STATES PATENT AND TRADEMARK OFFICE
CERTIFICATE OF CORRECTION

PATENT NO.    : 6,710,175 B2
DATED         : March 23, 2004
INVENTOR(S)   : Anderson et al.

It is certified that error appears in the above-identified patent and that said Letters Patent is hereby corrected as shown below:

Column 23,
Line 44, "and 40 82" should read -- and 40$\mu$eq/g --

Column 31,
Line 5, "For Experiments 15-15e," should read -- For Experiments 15a-15e, --

Signed and Sealed this

Thirtieth Day of November, 2004

JON W. DUDAS
*Director of the United States Patent and Trademark Office*